United States Patent
Lyu et al.

(10) Patent No.: US 12,550,024 B2
(45) Date of Patent: Feb. 10, 2026

(54) METHOD AND APPARATUS FOR WIRELESS COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/229,648

(22) Filed: Jun. 5, 2025

(65) Prior Publication Data
US 2025/0301384 A1 Sep. 25, 2025

Related U.S. Application Data

(63) Continuation of application No. PCT/CN2024/073886, filed on Jan. 24, 2024.

(51) Int. Cl.
*H04W 36/08* (2009.01)
*H04W 36/02* (2009.01)

(52) U.S. Cl.
CPC ......... *H04W 36/083* (2023.05); *H04W 36/02* (2013.01)

(58) Field of Classification Search
CPC .............................. H04W 36/083; H04W 36/02
See application file for complete search history.

(56) References Cited

U.S. PATENT DOCUMENTS

2022/0338159 A1 10/2022 Phuyal et al.
2025/0088929 A1* 3/2025 Sayed Hassan .. H04W 52/0206

FOREIGN PATENT DOCUMENTS

| WO | WO 2023010577 A1 | 2/2023 |
| WO | WO 2023013531 A1 | 2/2023 |
| WO | WO 2023131261 A1 | 7/2023 |

OTHER PUBLICATIONS

International Search Report and Written Opinion in International Appln. No. PCT/CN2024/073886, mailed on Sep. 20, 2024, 17 pages (with machine translation).

* cited by examiner

*Primary Examiner* — Justin Y Lee
(74) *Attorney, Agent, or Firm* — Fish & Richardson P.C.

(57) ABSTRACT

The present application provides a method and an apparatus for wireless communication. One example method includes: receiving, by a first communications device in a non-terrestrial network (NTN), a first notification transmitted by a second communications device in the NTN; determining, by the first communications device based on the first notification, first time information related to discontinuous coverage; and before entering a scenario without network coverage, determining, by the first communications device based on first time information, whether to hand over from a serving cell corresponding to a satellite in the NTN to a serving cell of a terrestrial network.

19 Claims, 5 Drawing Sheets

METHOD AND APPARATUS FOR WIRELESS COMMUNICATION

CROSS-REFERENCE TO RELATED APPLICATIONS

This application is a continuation of International Application No. PCT/CN2024/073886, filed on Jan. 24, 2024, the disclosure of which is hereby incorporated by reference in its entirety.

TECHNICAL FIELD

The present application relates to the field of communications technologies, and more specifically, to a method and an apparatus for wireless communication.

BACKGROUND

In some scenarios (for example, discontinuous coverage of a non-terrestrial network (non-terrestrial network, NTN)), a terminal device may fail to receive paging from a network side, and may not know that the related paging is lost, thus losing some important information. Therefore, how to improve reachability of the terminal device or how to make the terminal device know the lost paging is a technical problem that needs to be urgently resolved.

SUMMARY

The present application provides a method and an apparatus for wireless communication. Various aspects of embodiments of the present application are described below.

According to a first aspect, a method for wireless communication is provided, including: receiving, by a first communications device, a first notification transmitted by a second communications device; and providing, by the first communications device, an alarm alert based on the first notification, where the first notification is used to indicate one or more times of paging within a first time period, and the one or more times of paging include paging that has not been successfully received by the first communications device and/or paging that cannot be successfully received by the first communications device in a current state.

According to a second aspect, a method for wireless communication is provided, including: transmitting, by a second communications device, a first notification to a first communications device, where the first notification is used by the first communications device to provide an alarm alert, the first notification is further used to indicate one or more times of paging within a first time period, and the one or more times of paging include paging that has not been successfully received by the first communications device and/or paging that cannot be successfully received by the first communications device in a current state.

According to a third aspect, an apparatus for wireless communication is provided, where the apparatus is a first communications device, and the apparatus includes: a receiving unit, receiving a first notification transmitted by a second communications device; and an execution unit, providing an alarm alert based on the first notification, where the first notification is used to indicate one or more times of paging within a first time period, and the one or more times of paging include paging that has not been successfully received by the first communications device and/or paging that cannot be successfully received by the first communications device in a current state.

According to a fourth aspect, an apparatus for wireless communication is provided, where the apparatus is a second communications device, and the apparatus includes: a transmitting unit, transmitting a first notification to a first communications device, where the first notification is used by the first communications device to provide an alarm alert, the first notification is further used to indicate one or more times of paging within a first time period, and the one or more times of paging include paging that has not been successfully received by the first communications device and/or paging that cannot be successfully received by the first communications device in a current state.

According to a fifth aspect, a communications apparatus is provided, including a memory and a processor, where the memory is configured to store a program, and the processor is configured to invoke the program in the memory to execute a method according to the first aspect or the second aspect.

According to a sixth aspect, an apparatus is provided, including a processor, invoking a program from a memory to execute a method according to the first aspect or the second aspect.

According to a seventh aspect, a chip is provided, including a processor, invoking a program from a memory to cause a device on which the chip is installed to execute a method according to the first aspect or the second aspect.

According to an eighth aspect, a computer-readable storage medium is provided, where a program is stored on the computer-readable storage medium, and the program causes a computer to execute a method according to the first aspect or the second aspect.

According to a ninth aspect, a computer program product is provided, including a program, where the program causes a computer to execute a method according to the first aspect or the second aspect.

According to a tenth aspect, a computer program is provided, where the computer program causes a computer to execute a method according to the first aspect or the second aspect.

In embodiments of the present application, a first communications device may determine, based on a first notification, paging that has not been successfully received or paging that cannot be successfully received, so as to provide an alarm alert. It may be learned that when the first communications device loses paging or is in a state in which paging cannot be normally received, a second communications device may remind the first communications device through the first notification. Further, the first communications device may alert a user through the alarm alert, so that the user determines whether to promptly convert a state of a terminal device into a state in which paging can be normally received.

DETAILED DESCRIPTION OF THE EMBODIMENTS

Figure 1:
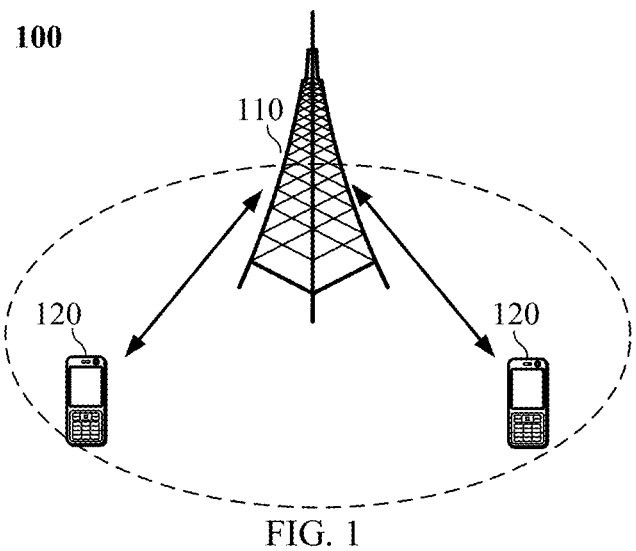
FIG. 1 shows a wireless communications system to which an embodiment of the present application is applied.

The following describes the technical solutions in embodiments of the present application with reference to the accompanying drawings in embodiments of the present application. Apparently, the described embodiments are some rather than all of embodiments of the present application. Based on embodiments of the present application, all other embodiments obtained by a person of ordinary skill in the art without creative efforts fall within the protection scope of the present application.

Embodiments of the present application may be applied to various communications systems. For example, embodiments of the present application may be applied to a global system for mobile communications (global system of mobile communication, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an advanced long term evolution (advanced long term evolution, LTE-A) system, a new radio (new radio, NR) system, an evolution system of an NR system, an LTE-based access to unlicensed spectrum (LTE-based access to unlicensed spectrum, LTE-U) system, an NR-based access to unlicensed spectrum (NR-based access to unlicensed spectrum, NR-U) system, an NTN system, a universal mobile telecommunications system (universal mobile telecommunication system, UMTS), a wireless local area network (wireless local area networks, WLAN), wireless fidelity (wireless fidelity, WiFi), and a 5th generation (5th-generation, 5G) communications system. Embodiments of the present application may be further applied to another communications system, such as a future communications system. The future communications system may be, for example, a 6th generation (6th-generation, 6G) mobile communications system, or a satellite (satellite) communications system.

Conventional communications systems support a limited quantity of connections and are easy to implement. With the development of communications technologies, a communications system may support not only conventional cellular communication but also one or more other types of communication. For example, the communications system may support one or more types of the following communication: device-to-device (device to device, D2D) communication, machine-to-machine (machine to machine, M2M) communication, machine type communication (machine type communication, MTC), enhanced machine type communication (enhanced MTC, eMTC), vehicle-to-vehicle (vehicle to vehicle, V2V) communication, vehicle-to-everything (vehicle to everything, V2X) communication, and the like. Embodiments of the present application may also be applied to a communications system that supports the foregoing communication manners.

The communications system in embodiments of the present application may be applied to a carrier aggregation (carrier aggregation, CA) scenario, a dual connectivity (dual connectivity, DC) scenario, or a standalone (standalone, SA) networking scenario.

The communications system in embodiments of the present application may be applied to an unlicensed spectrum. The unlicensed spectrum may also be considered as a shared spectrum. Alternatively, the communications system in embodiments of the present application may be applied to a licensed spectrum. The licensed spectrum may also be considered as a dedicated spectrum.

Embodiments of the present application may be applied to an NTN system. For example, the NTN system may be a 4G-based NTN system, an NR-based NTN system, an internet of things (internet of things, IoT)-based NTN system, or a narrow band-internet of things (narrow band internet of things, NB-IoT)-based NTN system.

The communications system may include one or more terminal devices. The terminal device in embodiments of the present application may also be referred to as user equipment (user equipment, UE), an access terminal, a subscriber unit, a subscriber station, a mobile site, a mobile station (mobile station, MS), a mobile terminal (mobile Terminal, MT), a remote station, a remote terminal, a mobile device, a user terminal, a terminal, a wireless communications device, a user agent, a user apparatus, or the like.

In some embodiments, the terminal device may be a station (STATION, ST) in a WLAN. In some embodiments, the terminal device may be a cellular phone, a cordless phone, a session initiation protocol (session initiation protocol, SIP) phone, a wireless local loop (wireless local loop, WLL) station, a personal digital assistant (personal digital assistant, PDA) device, a handheld device having a wireless communication function, a computing device or any other processing device connected to a wireless modem, a vehicle-mounted device, a wearable device, a terminal device in a next generation communications system (such as an NR system) or a terminal device in a future evolved public land mobile network (public land mobile network, PLMN), or the like.

In some embodiments, the terminal device may be a device providing a user with voice and/or data connectivity. For example, the terminal device may be a handheld device, a vehicle-mounted device, or the like having a wireless connection function. In some specific examples, the terminal device may be a mobile phone (mobile phone), a tablet computer (Pad), a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

In some embodiments, the terminal device may be deployed on land. For example, the terminal device may be deployed indoors or outdoors. In some embodiments, the terminal device may be deployed on water, for example, on a ship. In some embodiments, the terminal device may be deployed in the air, for example, on an airplane, a balloon, and a satellite.

In addition to the terminal device, the communications system may further include one or more network devices. The network device in embodiments of the present application may be a device for communicating with the terminal device. The network device may also be referred to as an access network device or a wireless access network device. The network device may be, for example, a base station. The network device in embodiments of the present application may be a radio access network (radio access network, RAN) node (or device) that connects the terminal device to a wireless network. The base station may broadly cover various names in the following, or may be replaced with the following names: a NodeB (NodeB), an evolved NodeB (evolved NodeB, eNB), a next generation NodeB (next generation NodeB, gNB), a relay station, an access point, a transmitting and receiving point (transmitting and receiving point, TRP), a transmitting point (transmitting point, TP), a master eNode (MeNB), a secondary eNode (SeNB), a multi-standard radio (MSR) node, a home base station, a network controller, an access node, a wireless node, an access point (access point, AP), a transmission node, a transceiver node, a baseband unit (base band unit, BBU), a remote radio unit (remote radio unit, RRU), an active antenna unit (active antenna unit, AAU), a remote radio head (remote radio head, RRH), a central unit (central unit, CU), a distributed unit (distributed unit, DU), a positioning node, or the like. The base station may be a macro base station, a micro base station, a relay node, a donor node, or the like, or a combination thereof. Alternatively, the base station may be a communications module, a modem, or a chip disposed in the device or the apparatus described above. The base station may be alternatively a mobile switching center, a device that functions as a base station in D2D, V2X, and M2M communication, a network side device in a 6G network, a device that functions as a base station in a future communications system, or the like. The base station may support networks with a same access technology or different access technologies. A specific technology and a specific device form used by the network device are not limited in embodiments of the present application.

The base station may be fixed or mobile. For example, a helicopter or an unmanned aerial vehicle may be configured to serve as a mobile base station, and one or more cells may move based on a location of the mobile base station. In another example, a helicopter or an unmanned aerial vehicle may be configured to serve as a device in communication with another base station.

In some deployments, the network device in embodiments of the present application may be a CU or a DU, or the network device includes a CU and a DU. The gNB may further include an AAU.

In an example rather than limitation, in embodiments of the present application, the network device may have a mobile feature. For example, the network device may be a movable device. In some embodiments of the present application, the network device may be a satellite or a balloon station. In some embodiments of the present application, the network device may alternatively be a base station located on land, water, or the like.

In embodiments of the present application, the network device may serve a cell, and the terminal device communicates with the network device by using a transmission resource (for example, a frequency resource or a spectrum resource) used by the cell. The cell may be a cell corresponding to the network device (for example, a base station). The cell may belong to a macro base station or belong to a base station corresponding to a small cell (small cell). The small cell herein may include: a metro cell (metro cell), a micro cell (micro cell), a pico cell (pico cell), a femto cell (femto cell), or the like. These small cells have small coverage and low transmit power, and are suitable for providing a high-rate data transmission service.

For example, FIG. 1 is a schematic diagram of an architecture of a communications system according to an embodiment of the present application. As shown in FIG. 1, a communications system 100 may include a network device 110, and the network device 110 may be a device that communicates with a terminal device 120 (or referred to as a communications terminal or a terminal). The network device 110 may provide communication coverage for a specific geographic area, and may communicate with a terminal device within the coverage area.

FIG. 1 exemplarily shows one network device and two terminal devices. In some embodiments of the present application, the communications system 100 may include a plurality of network devices, and another quantity of terminal devices may be included within coverage of each network device. This is not limited in embodiments of the present application.

Figure 2:
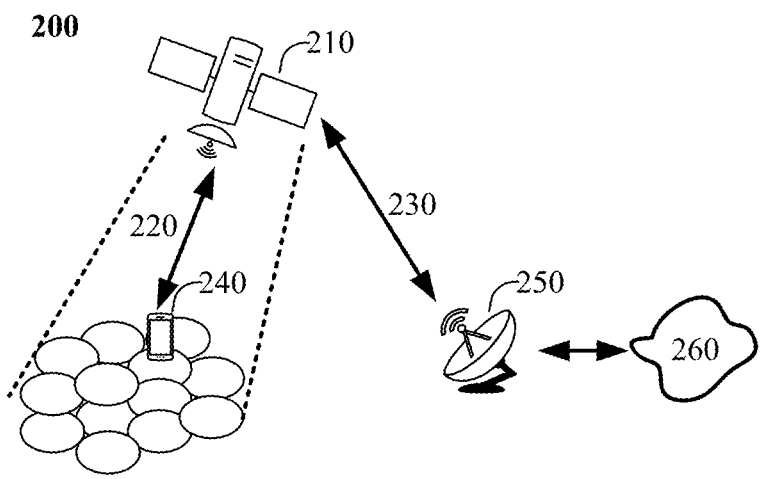
FIG. 2 shows an NTN system to which an embodiment of the present application is applied.

For example, FIG. 2 is a schematic diagram of an architecture of the foregoing NTN system. An NTN system 200 shown in FIG. 2 uses a satellite 210 as an aerial platform. As shown in FIG. 2, a satellite radio access network includes the satellite 210, a service link 220, a feeder link 230, a terminal device 240, a gateway (gateway, GW) 250, and a network 260 including a base station and a core network.

The satellite 210 is a spacecraft based on a space platform. The service link 220 is a link between the satellite 210 and the terminal device 240. The feeder link 230 is a link between the gateway 250 and the satellite 210. The earth-based gateway 250 connects the satellite 210 to a base station or a core network, depending on selection of an NTN architecture.

The NTN architecture shown in FIG. 2 is a bent pipe transponder architecture. In this architecture, the base station is located on the earth behind the gateway 250, and the satellite 210 serves as a relay. The satellite 210 operates as a repeater for forwarding signals of the feeder link 230 to the service link 220, or forwarding signals of the service link 220 to the feeder link 230. In other words, the satellite 210 does not have a function of a base station, and communication between the terminal device 240 and the base station in the network 260 needs to be relayed by using the satellite 210.

Figure 3:
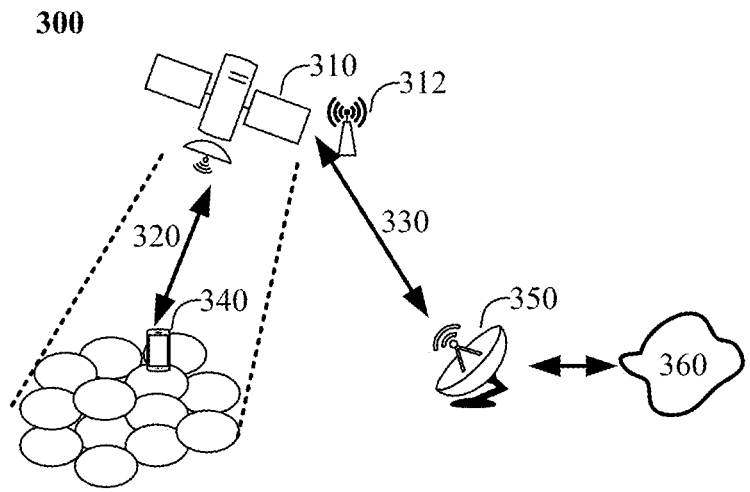
FIG. 3 shows another NTN system to which an embodiment of the present application is applied.

For example, FIG. 3 is a schematic diagram of another architecture of an NTN system. As shown in FIG. 3, a satellite radio access network 300 includes a satellite 310, a service link 320, a feeder link 330, a terminal device 340, a gateway 350, and a network 360. FIG. 3 differs from FIG. 2 in that a base station 312 is provided on the satellite 310, and the network 360 behind the gateway 350 includes only a core network.

The NTN architecture shown in FIG. 3 is a regenerative transponder architecture. In this architecture, the satellite 310 carries the base station 312, and may be directly connected to an earth-based core network by using a link. The satellite 310 has a function of a base station, and the terminal device 340 may directly communicate with the satellite 310. Therefore, the satellite 310 may be referred to as a network device.

The communications systems in the architectures shown in FIG. 2 and FIG. 3 may include a plurality of network devices, and another quantity of terminal devices may be included in coverage of each network device. This is not limited in embodiments of the present application.

In embodiments of the present application, the communications systems shown in FIG. 1 to FIG. 3 may further include another network entity such as a mobility management entity (mobility management entity, MME) or an access and mobility management function (access and mobility management function, AMF). This is not limited in embodiments of the present application.

It should be understood that a device having a communication function in a network/system in embodiments of the present application may be referred to as a communications device. The communications system 100 shown in FIG. 1 is used as an example. A communications device may include the network device 110 and the terminal device 120 having a communication function, and the network device 110 and the terminal device 120 may be specific devices described above. Details are not described herein again. The communications device may further include other devices in the communications system 100, such as a network controller, a mobility management entity, and other network entities. This is not limited in embodiments of the present application.

For ease of understanding, some related technical knowledge related to embodiments of the present application is first introduced. The following related technologies, as optional solutions, may be arbitrarily combined with the technical solutions of embodiments of the present application, all of which fall within the protection scope of embodiments of the present application. Embodiments of the present application include at least a part of the following content.

With the development of communications technologies, a communications system (for example, 5G) will integrate market potential of a satellite and a terrestrial network infrastructure. For example, 5G standards make an NTN, including a satellite segment, become a part of commonly recognized 3rd generation partnership project (3rd generation partnership project, 3GPP) 5G connection infrastructure.

The NTN is a network or a network segment that uses a radio frequency (radio frequency, RF) resource on a satellite or an unmanned aerial system (unmanned aerial system, UAS) platform. A satellite is used as an example. Depending on different orbital altitudes, communications satellites are classified into low earth orbit (low earth orbit, LEO) satellites, medium earth orbit (medium earth orbit, MEO) satellites, geostationary earth orbit (geostationary earth orbit, GEO) satellites, high elliptical orbit (high elliptical orbit, HEO) satellites, and the like. An LEO is an earth-centered orbit with an altitude of 2000 km or less, or at least 11.25 periods per day, and an eccentricity less than 0.25. Most artificial objects in outer space are located on the LEO. The LEO satellites operate around the earth at a high speed (mobility), but on a predictable or definite orbit.

Satellites with different orbital altitudes have different orbital periods. For example, an LEO has a typical altitude ranging from 250 km to 1500 km, and an orbital period ranging from 90 minutes to 120 minutes. An MEO has a typical altitude ranging from 5000 km to 25000 km, and an orbital period ranging from 3 hours to 15 hours. A GEO has an altitude of about 35,786 km and an orbital period of 24 hours.

It may be learned from FIG. 2 and FIG. 3 in which a satellite is used as an example that a typical scenario of accessing an NTN system by a terminal device involves an NTN transparent payload (payload) or an NTN regenerative payload. The bent pipe transponder architecture shown in FIG. 2 corresponds to the NTN transparent payload, and the regenerative transponder architecture shown in FIG. 3 corresponds to the NTN regenerative payload.

In the NTN system, a communications device may predict, based on an ephemeris and an epoch time (epoch time) of a satellite, a trajectory of a serving cell for which the satellite may provide a service. For example, a terminal device may estimate the trajectory of the serving cell on the earth by predicting a location of the satellite.

In some embodiments, a serving cell in the NTN is typically an area served by one or more satellites. For example, a plurality of satellites may form a satellite constellation to serve a terminal device in an NTN cell.

However, in the NTN, a coverage time of the satellite is limited, especially for an earth moving cell. Even during operation of the satellite constellation, a terrestrial terminal device may be in a scenario with no network coverage. In other words, in coverage of the NTN, the terminal device may be in a discontinuous coverage (discontinuous coverage) service. For example, when a current satellite or a next satellite covers an area in which the terminal device is located, the terminal device is in a communication state with network coverage. Conversely, when the current satellite leaves the area in which the terminal device is located and the next satellite has not yet covered the area, the terminal device is in a coverage gap with no network coverage.

In some embodiments, due to a limited quantity of satellites in an orbit, a network service for a terrestrial terminal device may be in discontinuous coverage. For example, for an internet of things-based earth moving cell, there may be no satellite available to provide a service for a terminal device at a specified instant. That is, when an internet of things is in NTN coverage, an internet of things device may be in discontinuous coverage in time domain instead of spatial domain.

In some embodiments, even though a terminal device is within a geographic coverage area of a satellite, beam (beam) coverage of the satellite may not include the terminal device. In this scenario, the terminal device may be in an area of discontinuous coverage. For ease of understanding, the following uses a moving cell as an example for description with reference to a discontinuous coverage scenario shown in FIG. 4.

Figure 4:
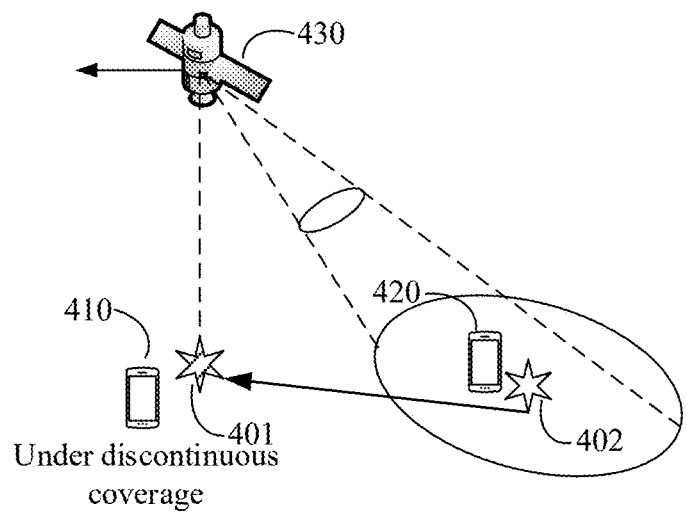
FIG. 4 is a schematic diagram of a possible scenario in which a terminal device is in discontinuous coverage.

In an NTN system shown in FIG. 4, both a terminal device 410 and a terminal device 420 are within a geographical coverage area of a satellite 430. The terminal device 410 is located near a location 401 of the satellite 430 perpendicular to the ground, and the terminal device 420 is located near a location 402. It may be learned from FIG. 4 that a beam center transmitted by the satellite 430 at an epoch time t (beam center at epoch time) corresponds to the ground location 402, and the satellite 430 may serve the terminal device 420. However, because the beam center is not perpendicular to the ground projection location 401 of the satellite 430, the satellite 430 cannot serve the terminal device 410. Therefore, the terminal device 410 is in a discontinuous coverage scenario.

It may be learned from FIG. 4 that there may be a scenario of network discontinuous coverage in NTN coverage. However, a TN system, such as LTE, NB-IoT, eMTC, NR, or another communications system, may exist in an NTN coverage area or an area with no NTN coverage.

In some embodiments, coverage of an NTN cell served by a satellite is generally large. For example, one NTN cell may cover both marine and land areas. For another example, many land cells may be available in one NTN cell. A land unit may also be referred to as a terrestrial network (terrestrial network, TN) cell or a TN area.

In an example, for an NB-IoT or MTC system, a TN area may have a dedicated NB-IoT base station.

In an example, enhanced mobile broadband (enhance mobile broadband, eMBB), ultra-reliable low latency communications (ultra reliable low latency communications, uRLLC), massive machine type communications (massive machine type communications, mMTC), and an LTE or NR network may be implemented on one platform based on slices. For example, in a form of software, the foregoing different applications or networks may be implemented on one platform.

When a terminal device is in a discontinuous coverage scenario, communication of the terminal device needs to consider a case of no network coverage. For example, within a coverage time of a satellite, when the terminal device attempts to initiate connection establishment, a remaining coverage time may be too short to complete the connection establishment.

Optionally, the terminal device may predict information about a time when network coverage is lost, to check whether a remaining coverage time of a current cell is enough to meet a connection establishment requirement, so as to ensure that the terminal device can successfully establish communication with the satellite. In addition, the terminal device that is about to lose network coverage may make preparations (for example, enter an RRC idle state (RRC_idle) or a sleep state), thereby further reducing power consumption.

In an example, the terminal device may obtain ephemeris information of the satellite, and further determine, based on a location of the terminal device and the ephemeris information, a critical time when the terminal device is located at a coverage boundary of a satellite signal. The critical time may be used to determine recommendation information for the terminal device to perform state conversion. For example, a departure time at which the terminal device exits coverage of the satellite signal may be determined based on the critical time. The departure time may be used to determine duration in which the terminal device is within the coverage of the satellite signal. The duration may be used to determine wakeup duration of the terminal device for the recommendation information.

In an example, for an earth fixed cell served by a non-geostationary orbit (non-geostationary orbit, NGSO) satellite, a network may provide a stop time of the cell, such as a service time (T-service). The terminal device may estimate, based on the service time, a time at which the terminal device arrives at a cell edge.

In an example, the terminal device may estimate a satellite parameter based on global navigation satellite system (global navigation satellite system, GNSS) positioning information, and estimate a time at which the terminal device arrives at a cell edge.

In an example, based on the predicted time information, both the terminal device and the network may determine when discontinuous coverage starts or when the terminal device is released to RRC_idle, thereby implementing synchronization. For a scenario of a moving cell, the stop time of the fixed cell cannot be used. When the terminal device predicts discontinuous coverage only based on location information, a prediction result may be inaccurate, as shown in FIG. 4.

Optionally, the NTN may provide assistance information for the terminal device to predict discontinuous coverage. In other words, the terminal device learns NTN coverage information based on the assistance information. When the terminal device is out of NTN coverage, the terminal device may directly enter a sleep state instead of executing an idle mode task, since the terminal device still needs to receive a paging message in an idle state. In addition, the terminal device may deactivate an access stratum (access stratum, AS) function of a terrestrial network, thereby eliminating a need to perform cell search on a TN even in an idle state.

In an example, when the terminal device is in the NTN, the assistance information may include information related to network coverage of the satellite, such as ephemeris information of the satellite. The terminal device may predict, based on the assistance information, whether the network coverage of the satellite is to be lost and whether the terminal device is within the network coverage of the satellite. For example, the terminal device may determine related time information about the loss of the network coverage of the satellite. The related time information may include at least one of the following: duration of no network coverage, a time of entering no network coverage, or a time of returning to network coverage.

Optionally, the terminal device may predict and calculate a boundary of a TN serving cell. When a satellite cannot cover a terminal device, the terminal device may select a TN cell and enter coverage of a TN area, to fulfill a communication requirement of the terminal device. In a possible implementation, considering characteristics of the NTN, the network may configure a higher priority for measurement on a TN frequency than that on a NTN frequency.

In an example, the system may notify, by using a broadcast/system message (for example, the terminal device of a system information block (system information block, SIB)), information such as a frequency or a location of a specific TN area in an NTN area. For example, a method in which an NR NTN provides a terminal device with TN area information for the terminal device to perform TN measurement may also be used for IoT NTN discontinuous coverage. In other words, an internet of things NTN provides TN area information. When the terminal device is in discontinuous coverage, the terminal device triggers AS activation towards the TN based on the TN area information.

In an example, priorities of different frequencies or intersystem frequencies in the TN system may come from dedicated signalling such as an SIB or radio resource control (radio resource control, RRC) release (RRCRelease). For example, when no reselection priority is configured for inter-frequency in an SIB, the terminal device may not perform cell reselection measurement. For another example, the dedicated signalling may set a frequency priority in an NTN area. If a frequency priority is configured by using dedicated signalling, the terminal device ignores all priorities from SIBs.

In an example, for a quasi-earth moving cell, a coverage cell may provide a TN frequency list within a coverage area at different time points through broadcasting, and the frequency list may be periodically updated.

The foregoing describes the discontinuous coverage scenario in the NTN by using the internet of things as an example. Applications such as an internet of things and MTC are experiencing exponential growth and are expected to play a critical role in future networks and systems. In these systems, a terminal device has low data transmission frequency and does not need to constantly communicate with a network device. To save energy, the network side may configure a plurality of energy-saving modes for the terminal device.

For example, the NB-IoT is mainly designed for infrequent small data packet traffic, and a handover process in an RRC connected state (RRC connected) is not required. When a serving cell of an NB-IoT terminal device needs to be changed, the terminal device may perform RRC release to enter an idle state, and then reselect another cell. After selecting and residing on a new serving cell, the terminal device may start measurement of a neighboring cell based on a frequency of the neighboring cell and a measurement value of the serving cell in a system message broadcast by the serving cell.

For example, the NB-IoT terminal device does not support an emergency dialing function. In a case that the terminal device cannot find a suitable cell through reselection, the terminal device does not temporarily reside on an acceptable cell, but continues searching until a suitable cell is found.

Figure 5:
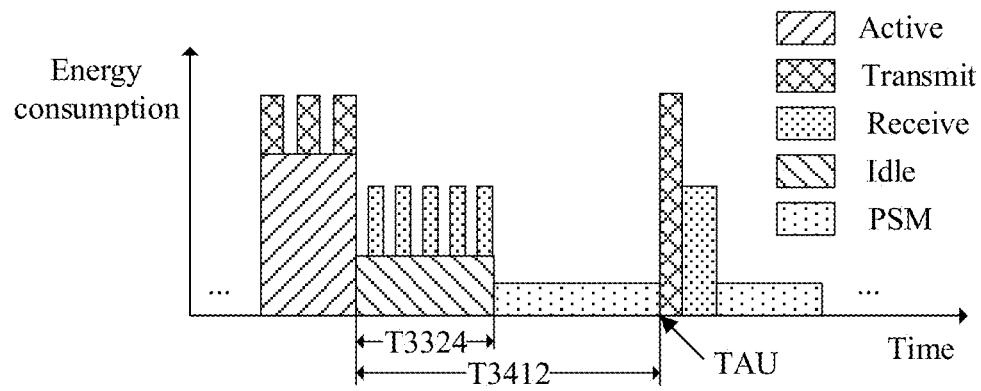
FIG. 5 is a schematic diagram of an energy saving configuration introduced for an internet of things.
Figure 6:
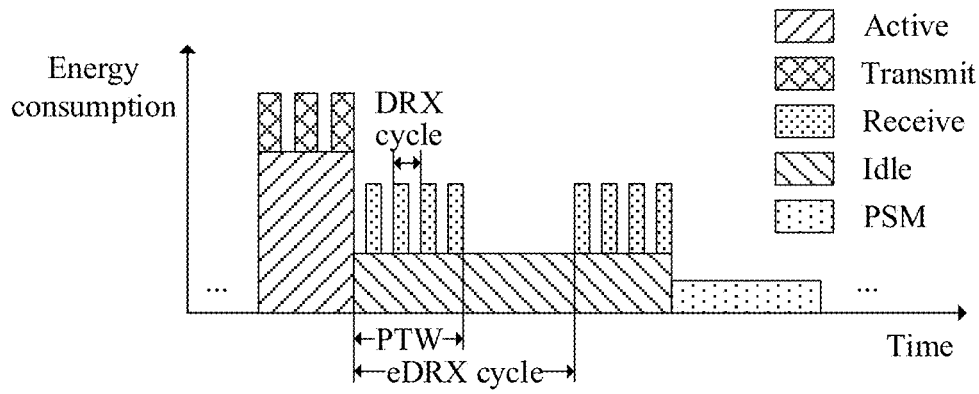
FIG. 6 is a schematic diagram of another energy saving configuration introduced for an internet of things.

For example, the NB-IoT may support three energy-saving modes: a power saving mode (power saving mode, PSM), a discontinuous reception (discontinuous reception, DRX) mode, and an extended discontinuous reception (extended DRX) mode. In the PSM mode, the terminal device does not need to receive paging (paging) to detect whether there is a downlink service. Compared with the DRX mode, the terminal device in the eDRX mode has a longer paging detection cycle. For ease of understanding, the following separately and exemplarily describes different energy-saving modes with reference to FIG. 5 and FIG. 6. In FIG. 5 and FIG. 6, a horizontal axis represents time, and a vertical axis represents energy consumption.

It may be learned from FIG. 5 that the terminal device may transmit data with higher energy consumption in an active (active) state, and mainly receives data with lower energy consumption in an idle state. After the idle state lasts for a period of time, if the terminal device does not enter the active state again, the terminal device directly enters a PSM state with lower energy consumption. The period of time in which the terminal device is in the idle state is duration of a T3324 timer.

Still referring to FIG. 5, a complete tracking area update (tracking area update, TAU) cycle is a sum of duration of the idle state and duration of the PSM state. Duration of one TAU cycle is defined as duration of a T3412 timer. Therefore, T3412 is TAU duration, and T3324 is a timer that triggers the terminal device's entry into the PSM state from the idle state.

FIG. 6 schematically describes related parameters in the eDRX mode. In the conventional DRX mode, a minimum interval is 2.56 seconds (DRX cycle). For the internet of things with infrequent data transmission, this time interval is too frequent. To further reduce power consumption caused by monitoring paging, the NB-IoT introduces an enhanced discontinuous reception eDRX technology. In each eDRX cycle, there is one paging time window (paging time window, PTW). Within the PTW, the terminal device monitors and responds to paging delivered by the network side.

The foregoing describes the plurality of energy-saving modes and the related parameters of the eDRX mode with reference to FIG. 5 and FIG. 6. It may be learned from FIG. 5 and FIG. 6 that energy consumption of the terminal device in the idle state and the PSM state is lower, thereby implementing energy saving.

It may be learned from the foregoing that the terminal device may fail to receive paging during discontinuous coverage, especially in a period with no network coverage. In this case, the terminal device serving as a paging receiving node may miss some important messages. The terminal device may need to know or want to know these important paging, helping a user confirm a paging message or contact an originating node of important paging.

Optionally, it may be unnecessary for an internet of things terminal device to promptly respond to paging of the network, but it may be necessary to know which paging may be lost. Especially in a case of discontinuous coverage, the terminal device cannot receive paging in a network coverage state. In this scenario, how the internet of things terminal device works is a problem worth studying.

In addition, important paging messages further include security-related paging, emergency paging, and the like. If the terminal device misses these paging, a significant issue may be caused. Therefore, a new mechanism needs to be designed to maximize reachability of the terminal device.

Optionally, in a case that a mobile terminal receives a call, the terminal device may be in a scenario with poor reception quality. For example, the terminal device may be placed in a pocket, a backpack, a vehicle, a boat, or a building. For another example, the terminal device may be in a scenario of wireless path congestion or wireless link quality degradation. In these scenarios, a user may experience poor reception quality and miss calls and information, which may be particularly harmful to security-related or emergency paging messages.

It should be noted that the foregoing problem that the terminal device fails to receive paging due to discontinuous coverage of the internet of things NTN system is merely an example. Embodiments of the present application may be applied to any type of scenario in which the terminal device may fail to receive paging.

Based on this, embodiments of the present application provide a method for wireless communication. In this method, a first notification received by a first communications device (for example, a terminal device) may indicate paging that has been lost or may be lost. The first communications device may trigger an alarm alert to a user based on the first notification. It may be learned that, based on the alarm alert, the user may promptly move to a location at which paging can be received or contact an originating node of lost paging, to avoid missing important information.

Figure 7:
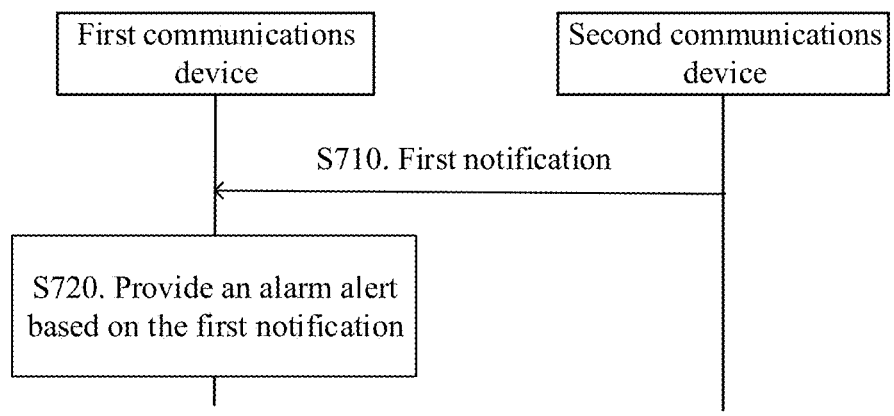
FIG. 7 is a schematic flowchart of a method for wireless communication according to an embodiment of the present application.

For ease of understanding, the following describes in detail the method proposed in embodiments of the present application with reference to FIG. 7. FIG. 7 is described from a perspective of interaction between a first communications device and a second communications device.

Referring to FIG. 7, in step S710, the first communications device receives a first notification (alert) transmitted by the second communications device.

The first communications device may be any terminal device or repeater that receives paging, which is not limited herein. In some embodiments, the first communications device is a terminal device with a low service transmission rate or less data transmission, for example, an NB-IoT terminal or an MTC terminal. In some embodiments, the first communications device is a device that supports an energy-saving configuration or a low-power configuration, for example, a DRX configuration or an eDRX configuration.

In an embodiment, the first communications device may be any one of the foregoing terminal devices, for example, UE.

In an embodiment, the first communications device is a terminal device in an NTN system. The terminal device may be located within a coverage area of a satellite. For example, the first communications device is a terminal device in an NTN internet of things.

In an embodiment, the first communications device is a communications device capable of receiving paging in any communications system.

In an embodiment, the first communications device is a device that the first notification is broadcasted to or that is configured to execute an action by using the first notification.

The first communications device may be a fixed terminal device or a moving terminal device, which is not limited herein. For example, the first communications device may be a terminal device on a running high-speed train.

In some embodiments, the second communications device transmits the first notification to the first communications device, and the first communications device is in any state capable of receiving a notification. For example, the first communications device may be in an RRC active state. For another example, the first communications device may be in an RRC idle state.

The second communications device may be any network device that transmits the first notification to the first communications device. In some embodiments, the second communications device includes a satellite in the NTN system, and the first communications device is a terminal device that performs communication through the satellite. For example, when a base station is deployed on the satellite, the first communications device directly communicates with the base station on the satellite. For example, when the satellite serves as a relay, the first communications device communicates with a terrestrial network device through the satellite.

In an embodiment, when the second communications device includes a satellite, the first communications device is located within a service area of the satellite at a current instant, so as to receive the first notification through the satellite.

In some embodiments, the second communications device may be alternatively any network side device that transmits paging. The network side device may include the foregoing network device, or may include a communications device on a core network (core network, CN) side. In an example, the second communications device may be a RAN node such as a base station. In an example, the second communications device may be a network element that transmits paging in a core network.

In some embodiments, a communications device that transmits paging is associated with a state of the first communications device. For a state of a terminal device except an RRC active state (RRC active), a RAN generally does not detect a paging fault, which is instead detected by the core network. In other words, when the first communications device is in an RRC idle state and an RRC inactive state (RRC inactive), the RAN may not be aware of a real reason for paging the first communications device. For example, when there is an emergency, the core network directly performs paging.

In an embodiment, after a radio link fails, a network side device may transmit many downlink internet protocol (internet protocol, IP) data packets to the first communications device.

In an embodiment, when the second communications device is a network element in a core network, the second communications device may transmit the first notification to the first communications device through a base station. In this case, the second communications device may include the base station and a related device in the core network.

In an embodiment, when the second communications device is a network element in a core network, the second communications device may directly transmit the first notification to the first communications device.

In some embodiments, paging and the first notification that are received by the first communications device may be from different network side devices. In other words, the second communications device may not include a network device that transmits paging to the first communications device. In an embodiment, the second communications device is a base station that transmits the first notification, and the paging received by the first communications device is from a network side device other than the second communications device. After determining content of the first notification, the network device that transmits paging may transmit the first notification to the first communications device through the second communications device.

In an embodiment, a satellite that transmits the first notification may be a first satellite that transmits paging, or may be a second satellite providing subsequent coverage.

The first notification is used to indicate one or more times of paging within a first time period. In some embodiments, a start time and an end time of or duration of the first time period may be determined based on a state of the first communications device, or may be determined based on a transmission cycle of paging, or may be determined based on a cycle in which the first communications device detects paging or a cycle in which the second communications device receives a paging response.

In some embodiments, the first time period may be any time period in which the first communications device cannot successfully receive paging.

In an example, the first time period may be a time period in which paging is lost before the first notification is transmitted. For example, when the first communications device is in an idle state in which link quality is relatively poor, the first time period may be a time period in which the first communications device is in an idle state.

In an example, the first time period may be a time period in which paging may fail to be received after the first notification is transmitted. For example, when the first communications device is in a discontinuous coverage scenario, the first time period may be a time period in which the first communications device has no network coverage.

In some embodiments, for a terminal device in an internet of things, the first time period may be related to a cycle in which the terminal device detects paging.

In an embodiment, the first time period may include one or more DRX cycles in which the first communications device is in an idle state. For example, the first time period may be one or more DRX cycles before the first notification is transmitted within a time period of the idle state.

In an embodiment, the first time period may include one or more eDRX cycles in which the first communications device is in an idle state.

In an example, a length of a DRX cycle or an eDRX cycle may be configured. For example, system information may provide a default DRX cycle length. For another example, dedicated signalling may provide a specific DRX cycle length for the first communications device.

In an example, a quantity of times of paging in a DRX cycle or an eDRX cycle may be configured, and may be provided in system information.

A quantity of the one or more times of paging is not limited. In some embodiments, a quantity of times of paging may be related to a length of the first time period. For example, when the first time period is one DRX cycle, there is one time of paging within the first time period indicated by the first notification. For another example, when the first time period is a plurality of DRX cycles, there is a plurality of times of paging within the first time period indicated by the first notification.

The one or more times of paging include paging that has not been successfully received by the first communications device and/or paging that cannot be successfully received by the first communications device in a current state. In other words, the one or more times of paging may include one or more times of paging that have been lost by the first communications device, and/or one or more times of paging that may be lost if the first communications device does not adjust the current state.

In an embodiment, the one or more times of paging may be paging related to the first communications device. In other words, the one or more times of paging are paging transmitted by the second communications device or another network side device to the first communications device.

Paging that has not been successfully received by the first communications device may be replaced with one of the following: paging that cannot be received by the first communications device, paging that is lost by the first communications device, or paging to which the second communications device does not receive a paging response.

In some embodiments, when the first communications device is in a state in which paging cannot be received, the one or more times of paging are paging that cannot be received. For example, for the first communications device in discontinuous coverage, paging cannot be received if there is no network coverage. For another example, when the first communications device is an internet of things terminal in a PSM state, paging cannot be received. For another example, when the first communications device fails to reselect a TN cell or continuously fails to find a cell to camp on, normal paging from a network cannot be detected.

In some embodiments, the first communications device is in a state capable of receiving paging, and the one or more times of paging are paging that has not been received. In other words, although the first communications device performs paging detection, paging is lost. For example, when the first communications device is in an idle state, if the first communications device is in an environment in which communication quality or coverage strength is relatively low, normal paging from a network may fail to be detected.

In an embodiment, the communication quality may be represented by using a plurality of parameters such as a signal to noise ratio (signal noise ratio, SNR) and reference signal received power (reference signal received quality, RSRQ), which is not limited herein. For brevity, the following uses the SNR as an example for description.

In some embodiments, the first communications device receives paging, but the second communications device fails to receive a paging response from the first communications device. For example, because downlink (downlink, DL) coverage strength is relatively high, the first communications device may detect a paging message. However, because a signal to noise ratio SNR of an uplink (uplink, UL) is not strong enough, the first communications device may fail to establish paging through an RRC resuming connection (RRC resuming connection), and thus the network side does not receive a paging response or similar information.

The paging that cannot be successfully received by the first communications device in the current state may be paging that is transmitted by the second communications device or another network device and that may fail to be received by the first communications device if the current state thereof is maintained.

In some embodiments, the current state may be a communication state in which the first communications device cannot receive normal paging. For example, when the first communications device is in an RRC idle state and uplink coverage strength is relatively low, paging from the network side may fail to be received. In this scenario, the first communications device may switch to an RRC active state with relatively strong uplink coverage based on the first notification.

In some embodiments, the current state may be a current communication scenario of the first communications device. For example, the first communications device is in a discontinuous coverage scenario in an NTN, and cannot receive paging from the network side after entering a scenario with no network coverage. The first communications device may hand over from an NTN cell to a nearby TN cell based on the first notification, so as to receive paging. The following is described with reference to an embodiment of the NTN.

In some embodiments, the current state may be a current communication environment of the first communications device. For example, the first communications device may fail to receive paging in an environment in which uplink and/or downlink coverage strength is relatively low. In this scenario, based on the first notification, the first communications device may remind a user to move to an environment in which coverage strength is relatively high, that is, adjust the current state.

The second communications device may identify the one or more times of paging within the first time period in a plurality of manners, to generate the first notification.

In some embodiments, after transmitting paging, the second communications device or a network device for transmitting paging may determine, based on a received paging response, whether the first communications device successfully receives the paging. For example, in one or more DRX cycles after paging is transmitted to the first communications device, if no paging response or similar information is received on the network side, it may be determined that the first communications device loses the paging.

In some embodiments, when paging needs to be transmitted to the first communications device, the second communications device may determine the first notification based on a communication state of the first communications device. The communication state may be the foregoing state in which the first communications device cannot successfully receive paging.

In an embodiment, when the first communications device cannot successfully receive paging in the current state, the second communications device may set a specific procedure to transmit the first notification, to remind the first communications device of a new call. For example, the first communications device may fail to receive paging in an environment in which both uplink and downlink SNRs are relatively poor, and a specific procedure is required on the network side so as to remind and notify the first communications device of the paging. For another example, if the first communications device is in an idle state, the network side may transmit a dedicated notification/an alarm signal (the first notification).

In an embodiment, the second communications device may predict or estimate a communication state of the first communications device within the first time period to determine whether to transmit the first notification. The following provides example descriptions with reference to a prediction manner of the second communications device.

In an embodiment, in some scenarios, paging cannot be received even if the first communications device adjusts the current state, and the first notification may be used to transmit paging lost by the first communications device. For example, in a case that a TN is unavailable, when the first communications device cannot hand over to a TN area and can only remain in an NTN area, the first communications device may be in an unreachable time. In an unreachable state, the first communications device cannot receive paging and the first notification that are transmitted by the network. After the first communications device transmits the unreachable time and unreachable duration to the network, the network transmits the first notification after the unreachable time of the first communications device ends.

In some embodiments, the second communications device may transmit the first notification based on a priority. For example, a priority of the first notification is higher than a priority of normal paging but lower than a priority of an emergency call.

In some embodiments, the second communications device may transmit the first notification based on a paging timeout mechanism, to determine that a paging message can be successfully received. When a regular paging signal fails to reach a user for one or more times, the first notification is transmitted.

In an embodiment, in a discontinuous coverage scenario, the first communications device may enter an idle state before leaving a coverage area. When the first communications device enters an idle state and is in coverage of a low SNR, reachability of the first communications device is very important. To ensure that a paging message is received, the second communications device may promptly remind the first communications device by using the first notification in a case that the regular paging signal fails to reach the user for one or more times.

The first notification may further include more information, so that the first communications device and the user determine whether to contact an originating node of lost paging, or determine whether to adjust the current state, thereby improving communication efficiency.

In some embodiments, the first notification may further include one or more of the following information: a message identity (identity, ID) corresponding to the first notification; a quantity of the one or more times of paging; an originating node of some or all paging in the one or more times of paging; a type of an event corresponding to the one or more times of paging; a priority of an event corresponding to the one or more times of paging; or a time parameter of an event corresponding to the one or more times of paging.

Optionally, the first notification may include the message ID used to transmit the first notification. When the first notification is a sequence, the message ID may include a sequence number. For example, the second communications device may include the selected message ID and sequence number in the first notification or add the selected message ID and sequence number to the first notification.

In an example, the message ID may be customized to uniquely identify a parameter and/or a delivery preference associated with a message. The delivery preference may be a priority, a waiting time, an expected device, or the like, which is related to the first notification. For example, the message ID may be used to determine a priority of transmission.

Optionally, the first notification may include the quantity of the one or more times of paging. In an example, for some internet of things terminals that are not required to respond to paging immediately, the terminal device may determine a severity of a matter based on a quantity of times of paging.

Optionally, the first notification may include the originating node of some or all paging in the one or more times of paging. When determining that the originating node is a device requiring a response, the first communications device may promptly contact the originating node, or move to a place with a better SNR. When determining that no response to the originating node is required, the first communications device may not contact the originating node or perform state adjustment, thereby saving power.

Optionally, the first notification may include the quantity of and the originating node of the one or more times of paging. For example, the first notification may include information parameters such as a quantity of times the terminal device has been paged and a source of paging. In this scenario, the first notification can help the user better determine whether the paging needs to be responded, and whether to switch a network or move to a place with a better SNR.

Optionally, the first notification may include related information of the event corresponding to the one or more times of paging. The event may be a paging initiation time or a paging-related event. For example, the related information of the event may include a type, a priority, a time parameter, and the like of the event.

In an example, the first notification may include a text message describing the event, a location of the event, or the like. The first communications device may generate a proper alert message based on the received event information and/or the determined context data.

In an example, the related information of the event may include an event type, an event severity, a category of the first communications device, an event priority, a location and/or a size of an area corresponding to the first notification, a wait time attribute related to delivery of the first notification, and a message ID. Further, the related information of the event may further include but is not limited to a historical pattern and/or trend, a device behavior, a user preference, a service provider preference and/or a policy, an event location, a current time/date, a weather condition, news, a scheduled activity in a related area, and the like. The scheduled activity is, for example, a concert, a parade, a political rally, or a football match.

In some embodiments, the first notification includes a first sequence. For example, the first notification may be the first sequence. For example, the first notification may be carried in the first sequence. The first sequence may be a physical signal sequence. For example, the first sequence includes an M sequence or a Gold sequence.

In an example, the first sequence is carried on a dedicated SIB or a dedicated signal that broadcasts the first notification, to facilitate transmission of the first sequence.

In some embodiments, a parameter related to the first communications device or the first notification may be used when the first sequence is generated or scrambled. For example, the first sequence may be generated and/or scrambled based on at least one of the following parameters: a physical cell ID; a temporary mobile subscriber identifier (temporary mobile subscriber identifier, TMSI) of the first communications device; an index number of a start time location of a transmission occasion of the first notification; an index number of a synchronization signal block associated with the first notification; or an index number of a time location associated with a $1^{st}$ physical downlink control channel (physical downlink control channel, PDCCH) corresponding to first paging.

In an embodiment, the first paging may be a $1^{st}$ time of paging within the first time period. The first paging may be the $1^{st}$ time of paging in the one or more times of paging, or may not be paging in the one or more times of paging. In other words, the $1^{st}$ time of paging within the first time period may be paging that has not been successfully received by the first communications device, or may be paging that has been successfully received by the first communications device.

In some embodiments, the second communications device may transmit the first notification in a plurality of manners. Optionally, the first notification may be carried in one or more of the following: a short message, a dedicated channel, or a system information block (SIB).

In an example, the second communications device may transmit a short messaging service (short messaging service, SMS)/data notification to the first communications device from an internet protocol multimedia subsystem (IP multimedia subsystem, IMS) server through NB-IoT. In other words, the first notification may be transmitted by using a short message.

In an embodiment, the first notification may be transmitted by using a dedicated channel. For example, the system may establish a dedicated paging alert notification channel, so that the first notification is transmitted as a reminder in an emergency.

In an embodiment, the second communications device may transmit the first notification by using an SIB such as an SIB 20. The first notification may be alternatively a message. For example, the SIB may transmit the first notification through a U-u radio interface in a logical channel corresponding to a broadcast control channel (broadcast control channel, BCCH). Optionally, a BCCH message is carried on a downlink shared channel (downlink-shared channel, DL-SCH) and transmitted on a physical downlink shared channel (physical downlink shared channel, PDSCH). Optionally, an SIB used to transmit notification data may be configured to carry broadcast data. The broadcast data is targeted at one or more types of IoT devices in a selected area.

In an embodiment, the first notification may be included in a control channel. In other words, the first notification is transmitted when the control channel is transmitted.

In an embodiment, the first notification may be transmitted separately. For example, the control channel may be transmitted after the first notification is transmitted.

In some embodiments, a transmit beam of the first notification may be associated with a synchronization signal block. In an embodiment, there may be a one-to-one association relationship between the first notification and the synchronization signal block. The first notification uses a same beam direction as the associated synchronization signal block.

In an embodiment, there is a one-to-many association between the first notification and actually transmitted synchronization signal blocks in a reference synchronization signal block set. A beam direction used by the first notification is one of beam directions of a plurality of associated synchronization signal blocks.

In some embodiments, a transmission parameter of the first notification includes parameters such as a quantity of transmission times of the first notification, a transmission occasion, and a transmission cycle (alert period). The transmission parameter of the first notification is determined based on one or more of the following parameters: a $1^{st}$ paging occasion within the first time period and a first offset; an end instant of the first time period and a second offset; a first notification level corresponding to the first notification; a quantity of first cycles included in the first time period; or a first quality parameter of a signal transmitted by the first communications device at a first instant.

In an embodiment, the first time period includes a plurality of paging occasions, and the transmission occasion of the first notification may be determined based on a start time and an end time and/or a paging occasion within the first time period. Example descriptions are provided below with reference to FIG. 8 to FIG. 10.

In an example, the transmission occasion of the first notification may be determined based on the $1^{st}$ paging occasion within the first time period and the first offset. In other words, the $1^{st}$ paging occasion and the first offset are used to determine the transmission occasion of the first notification.

For example, a start instant of transmitting the first notification may be a sum of an end instant of the $1^{st}$ paging occasion and the first offset.

For example, a start instant of transmitting the first notification may be a sum of a start instant of the $1^{st}$ paging occasion and the first offset.

It should be noted that, if the second communications device receives a paging response within a time period corresponding to the first offset, the second communications device does not transmit the first notification.

In an example, the transmission occasion of the first notification may be based on the end instant of the first time period and the second offset. In some scenarios, the second offset may allow the first communications device to have a buffer and decision-making time period before entering a PSM state. Based on this time period, the first communications device may determine whether to directly enter a PSM state or establish a connection to the network to accept paging cached by the network.

For example, a start instant of transmitting the first notification may be a difference of the end instant of the first time period minus the second offset.

For example, the first offset or the second offset is determined based on a service type of the first communications device and/or the first notification level. For example, the second communications device may select the first offset or the second offset with a corresponding magnitude for the service type of the first communications device. For another example, the second communications device may select the first offset or the second offset for the first notification level.

Optionally, the quantity of transmission times of the first notification may also be referred to as a quantity of repetition times of the first notification. Optionally, in a case that the first notification is relatively important, the second communications device may transmit the first notification for a plurality of times, so as to better remind the user to contact the originating node or adjust the current state. Optionally, when quality and/or strength of a signal related to a terminal device is relatively poor, the first notification may be transmitted for a plurality of times as a reminder.

Optionally, the quantity of transmission times of the first notification may be a quantity of times in one DRX cycle or eDRX cycle, or may be a total quantity of transmission times within the entire first time period, which is not limited herein. In an example, the second communications device may select the quantity of repetition times of the first notification from a list. The list may be mapped to a length of a DRX cycle or an eDRX cycle.

Optionally, the transmission cycle of the first notification may be determined based on the quantity of transmission times and the first time period. For example, the first notification is transmitted after a paging occasion of each DRX cycle in a PTW or after several DRX cycles. The PTW may determine or directly serve as the transmission cycle of the first notification.

In an example, first notifications of different levels may be designed to reflect different levels of quality and/or strength of terminal signals. For example, there may be low, medium, and high levels (level) of notifications for received signal quality and/or received signal strength. Each level corresponds to a different threshold (for example, an SNR threshold). For notifications of different levels, frequencies and times of transmitting the first notification are also different.

In an example, signal quality may be indicated by parameters such as an SNR, a signal to interference plus noise ratio (signal to interference plus noise ratio, SINR), a channel quality indicator (channel quality indicator, CQI), narrowband reference signal received quality (narrowband reference signal received quality, NRSRQ), reference signal received quality (reference signal received quality, RSRQ), energy (Es/Jot) of an IoT cell-specific reference signal (cell-specific reference signal, CRS), and energy (Es/Iot) of an IoT shared channel (shared channel, SCH). This is not limited herein.

In an example, signal strength may be indicated by parameters such as a path loss, a coupling loss, RSRP, narrowband reference signal received power (narrowband reference signal received power, NRSRP), and shared channel received power (shared channel received power, SCH RP). This is not limited herein.

In an example, notifications of different levels are designed, so that a level corresponding to the first notification can reflect importance of an event related to the first notification.

In an example, the first notification is triggered as a reminder either by each IP data packet or after several data packets.

Optionally, after a plurality of notification levels are designed, the first notification level corresponding to the first notification is any one of the plurality of notification levels. The related transmission parameter of the first notification may be determined based on the first notification level.

Optionally, the transmission parameter of the first notification may be alternatively determined based on the quantity of first cycles included in the first time period. The first cycle may be the DRX cycle or the eDRX cycle described above. A terminal device in an RRC idle state or an RRC inactive state may monitor paging/a first notification within each DRX cycle. In other words, the terminal device monitors one paging occasion per DRX cycle.

Optionally, the transmission parameter of the first notification may be alternatively determined based on the first quality parameter of the signal transmitted by the first communications device at the first instant. In other words, quality or strength of the signal received by the second communications device at the first instant may be referred to as the first quality parameter. The second communications device may predict or estimate a quality parameter of a signal at any instant after the first instant based on the first quality parameter.

In an example, the first instant may be a current instant, or may be any instant before the current instant.

In step S720, the first communications device provides an alarm alert based on the first notification. It may be learned that the first notification is used to issue an alarm alert to the first communications device. Therefore, the first notification may also be referred to as an alarm signal, a dedicated notification, an alert signal, or a paging warning notification.

In some embodiments, to provide the alert, the first notification may have an alerting function, or the first communications device may alert the user based on the first notification. For example, after receiving the first notification, a movable terminal device may remind the user or actively move to an area with a better SNR, to ensure service continuity.

The first communications device may provide the alarm alert in a plurality of manners. For example, the first communications device may provide the alarm alert through a sound. For example, the first communications device may provide the alarm alert through a vibration. For example, the first communications device may provide the alarm alert through a pop-up window on a graphical interface.

In an embodiment, the providing of the alarm alert may utilize most media/multimedia messages, or other types of manners.

In some embodiments, the first communications device may select a proper alarm manner to provide the alarm alert, thereby better reminding the user of paging that has been lost or paging that needs to be received. For example, a manner of providing the alarm alert may be determined based on at least one of a communication scenario of the first communications device, a user setting, or a first notification level corresponding to the first notification.

In some embodiments, the first communications device provides the alarm alert in a first manner. In an example, the first manner is determined based on the communication scenario of the first communications device. The communication scenario may be a scenario in which paging may fail to be received, such as a scenario where communication is performed on a high-speed train.

In an embodiment, the first manner may be selected based on a specific scenario and a user requirement. For example, the first communications device may be configured with a setting window for the user. The user may set corresponding manners of providing the alarm alert for different scenarios. For example, the first communications device may determine the first manner based on a message notification manner set by the user.

In some embodiments, the first communications device may provide the alarm alert by using an artificial intelligence (artificial intelligence, AI) component. For example, the first communications device may perform the alarm alert through methods such as intelligent processing/analysis and machine learning. For example, the first communications device may determine when and/or where to provide the alarm alert and a specific manner of providing the alarm alert based on AI and with reference to an attribute related to IoT service delivery in automatic determining. For example, the AI may be further used to determine whether the first manner is a sound, a vibration, or a pop-up window.

It should be noted that all communications devices in embodiments of the present application may adopt various AI-based schemes to execute various aspects in method embodiments. For example, the AI may be used by a communications device to determine where and/or when to broadcast the first notification/alarm alert. For another example, an automatic classifier system implemented through an artificial intelligence component may be used by a communications device to determine at least one of a target device at which the first notification/alarm alert is to be directed, a device category, a priority used to transfer the first notification/alarm alert, or a wait time attribute. Application of the AI in embodiments of the present application is described in detail below with reference to an embodiment in which the second communications device determines a second quality parameter.

With reference to FIG. 7, the foregoing describes the method embodiment in which the first communications device provides the alarm alert for the user based on the first notification. For the first communications device that has lost paging, missing important information may be avoided through the alarm alert. For the first communications device that may fail to receive paging, the alarm alert may improve reachability of the first communications device, thereby improving communication efficiency.

To determine in advance paging that the first communications device may fail to receive, the second communications device may predict a subsequent state of the first communications device based on its current state. In other words, if the first communications device does not adjust the current state, the second communications device may estimate or predict whether the first communications device may lose paging in a subsequent time period.

In some embodiments, the first quality parameter is used by the second communications device to predict a second quality parameter based on artificial intelligence, and the second quality parameter is a quality parameter of a signal transmitted by the first communications device at any instant after the first instant.

Optionally, the prediction based on artificial intelligence may be prediction performed through an AI component. The AI component may utilize various AI methods or machine learning methods. For example, the AI technology may typically apply an advanced mathematical algorithm to a data set. The advanced mathematical algorithm is, for example, a decision tree, a neural network, regression analysis, principal component analysis (principal component analysis, PCA) for feature and pattern extraction, cluster analysis, a genetic algorithm, or reinforcement learning. A communications device may automatically learn and execute a plurality of functions.

In an example, the AI component may learn data by using one or more of the foregoing many methods, and then derive an inference from a constructed model. For example, a hidden Markov model (hidden Markov model, HMM) and a related prototype dependency model may be used to determine the second quality parameter. For another example, a general probabilistic graphical model may be used for prediction. The probabilistic graphical model such as a Dempster-Shafer network or a Bayesian network is a network created through structure search.

In an example, the second communications device may continue to predict the second quality parameter by using a Bayesian model score or an approximation.

Optionally, the AI component in embodiments of the present application may alternatively employ a linear classifier, a nonlinear classifier, and a fuzzy logic method. The linear classifier is, for example, a support vector machine (support vector machine, SVM). The nonlinear classifier is, for example, a "neural network" method.

In some embodiments, the second communications device may further employ advanced AI and mathematical techniques to analyze efficiency of each data link (physical and virtual) to determine a proportion of data to be transmitted over each link, thereby maximizing (or improving) data transmission efficiency.

In some embodiments, the second communications device may directly determine the second quality parameter based on the first quality parameter. For example, assuming that the first instant is an instant k, the first communications device enters an RRC idle state at an instant k+n (n>0). The second communications device may predict, based on a network coverage state, types of different services, and/or SNRs of signals of the first communications device at an instant k−1 and an instant k, an SNR in a DRX period during which the first communications device enters an RRC idle state.

For example, at an instant k, a base station may store, by using a register, an SNR of a terminal signal received at an instant k−1. Then, the base station may estimate or predict or determine, based on artificial intelligence, an SNR of a terminal signal received at an instant k+n.

For example, the first communications device may be a terminal device i of M terminal devices, where M is a positive integer, and i is a natural number from 0 to M−1. When the first quality parameter at an instant k is $SNR_i(k)$, a quality parameter $SNR_i(k+n)$ of a signal transmitted by the terminal device i at an instant k+n is:

$$SNR_i(k+n) = SNR_i(k) + n * [SNR_i(k) - SNR_i(k-1)],$$

where $SNR_i(k-1)$ represents a quality parameter of a signal transmitted by the terminal device i at an instant k−1, and k>1.

As described above, the first notification level may be determined based on signal quality. Therefore, the second quality parameter may be used to determine a notification level corresponding to the first notification. The first notification level is the notification level corresponding to the first notification.

In some embodiments, the first notification level is one of a plurality of notification levels. The plurality of notification levels may be determined based on a plurality of thresholds of different magnitudes. When one threshold is set, there may be two notification levels. When S1 thresholds are set, there may be S+1 notification levels.

In an example, the first notification level may be determined based on the second quality parameter and a plurality of thresholds. The second quality parameter may be used to select the first notification level from the plurality of notification levels.

In an example, the plurality of thresholds includes a first threshold and a second threshold that are related to the second quality parameter, and the first threshold is less than the second threshold. It should be understood that the threshold's relation to the second quality parameter may include: a parameter type of the threshold being the same as a parameter type of the quality parameter, and/or a magnitude of the threshold being determined based on the second quality parameter.

When the first notification is repeatedly transmitted, the second quality parameter and the plurality of thresholds are used to determine the quantity of repetition times of the first notification. For example, the second quality parameter, the first threshold, and the second threshold are used to determine the quantity of repetition times of the first notification.

Optionally, the first notification may be transmitted in each DRX cycle. For example, the first notification is transmitted within or after X slots following a paging occasion in each DRX cycle. If the first communications device still cannot be connected to the network after one or more first notifications are transmitted, the network may consider that the first communications device is in an unreachable state even before an estimated unreachable instant is reached.

Optionally, the first notification may be transmitted in every two or more DRX cycles. For example, the first notification is transmitted in X slots after a last paging occasion in every two DRX cycles. If the first communications device still cannot be connected to the network after the first notification is transmitted, the network may consider that the first communications device is in an unreachable state even before an estimated unreachable instant is reached.

Optionally, the first notification may be transmitted only once within the first time period. For example, the second communications device may initiate the first notification only in a $1^{st}$ DRX cycle. For another example, the second communications device may transmit the first notification only after a last time of paging within the first time period. In other words, a single warning is issued to remind the first communications device that there is paging and the first communications device needs to promptly establish a connection with the network.

In an example, the first time period includes Q first cycles, Q is a positive integer greater than 1, and the quantity N of repetition times of the first notification is: when the second quality parameter is less than or equal to the first threshold, N is equal to Q or Q−1; when the second quality parameter is greater than the first threshold and is less than or equal to the second threshold, N is greater than 1 and less than Q; or when the first quality parameter is greater than the second threshold, N is equal to 1.

For example, when $SNR_{target1}$ is the first threshold and $SNR_{target2}$ is the second threshold, N is:

$SNR_i(k+n) \leq SNR_{target1}$, where the second communications device initiates the first notification in each DRX cycle; the transmission cycle of the first notification is close to a DRX cycle; and when there is still time for transmitting the first notification after a last DRX cycle, N=Q; or if there is no time, N=Q−1;

$SNR^{target1} < SNR_i \leq (k+n) \ SNR_{target2}$, where the second communications device initiates the first notification in every two or more DRX cycles; and the transmission cycle of the first notification is approximately twice or more as large as a DRX cycle; or $SNR_i(k+n) > SNR_{target2}$, where the second communications device transmits the first notification only once within the first time period.

Figure 8:
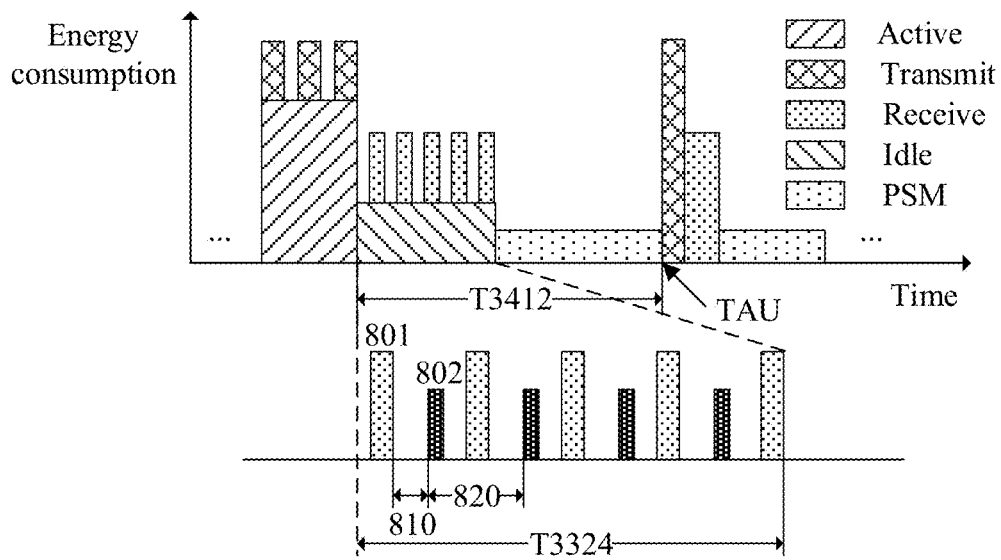
FIG. 8 is a schematic diagram of a possible implementation of the method shown in FIG. 7.
Figure 9:
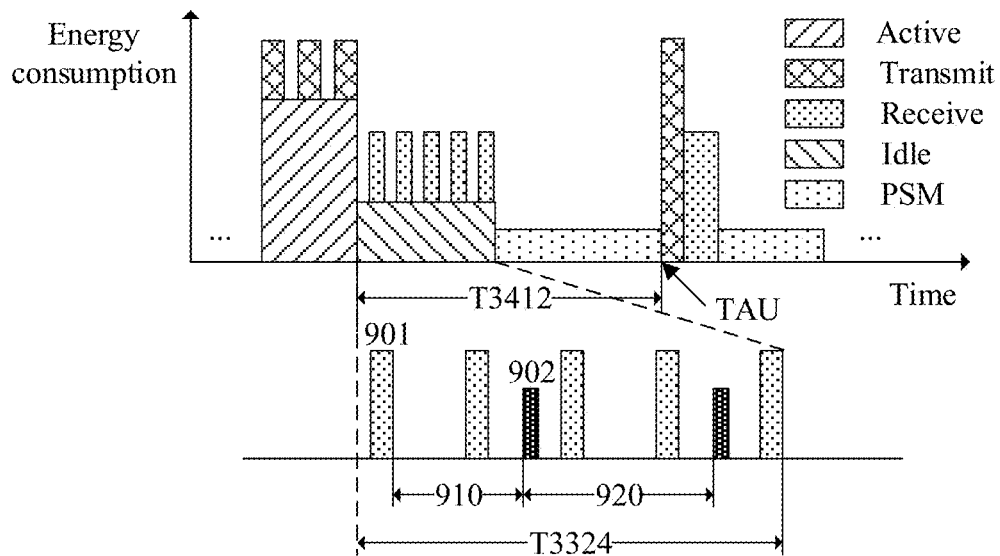
FIG. 9 is a schematic diagram of another possible implementation of the method shown in FIG. 7.
Figure 10:
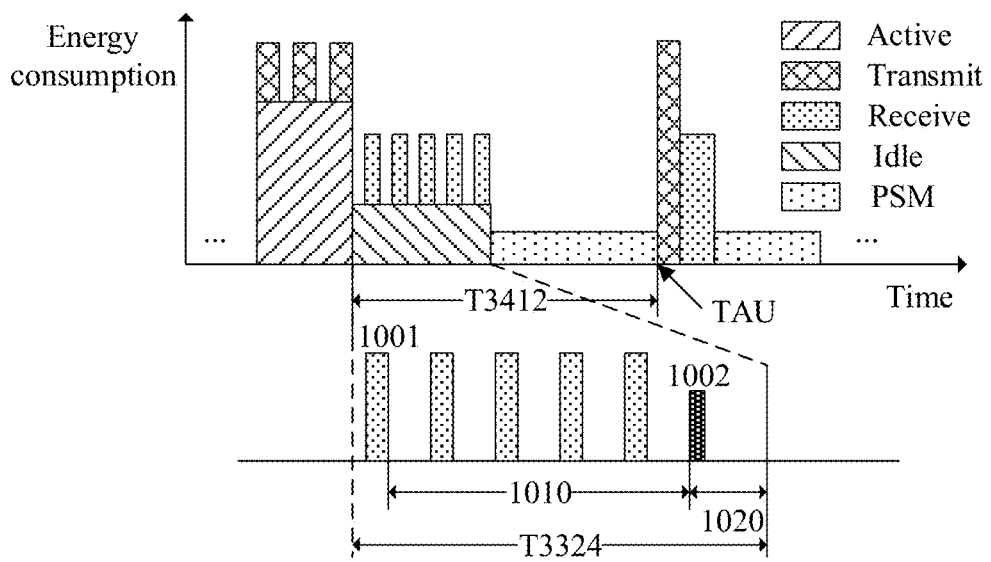
FIG. 10 is a schematic diagram of still another possible implementation of the method shown in FIG. 7.

For ease of understanding, the following provides example descriptions with reference to FIG. 8 to FIG. 10. The second quality parameter is less than the first threshold in FIG. 8, the second quality parameter is greater than the first threshold and less than the second threshold in FIG. 9, and the second quality parameter is greater than the second threshold in FIG. 10.

Referring to FIG. 8, the first time period is a time period in an idle state. Duration of the first time period is the same as duration of a timer T3324. The first time period includes five paging occasions 801 (Q=5) and four alarm occasions 802 (N=4). The alarm occasion is the transmission occasion of the first notification. There is a first offset 810 between a $1^{st}$ first alarm occasion 802 and a $1^{st}$ paging occasion 801. An interval 820 of the alarm occasion 802 is a transmission cycle.

It may be learned from FIG. 8 that the second communications device transmits the first notification after the $1^{st}$ paging occasion plus the first offset (offset1) 810.

In FIG. 9, the first time period includes five paging occasions 901 (Q=5) and two alarm occasions 902 (N=2). A first offset 910 is greater than the first offset 810. An interval 920 of the alarm occasion 902 is a transmission cycle, which is approximately twice as large as a DRX cycle.

In FIG. 10, the first time period includes five paging occasions 1001 (Q=5) and one alarm occasion 1002 (N=1). The alarm occasion 1002 is after the last paging occasion 1001. A second offset 1020 is determined based on an end instant of the first time period.

Optionally, the plurality of thresholds used to determine the plurality of notification levels may be dynamically adjusted, so as to more flexibly transmit the first notification. In other words, any one of the plurality of thresholds may be dynamically adjusted. For example, an SNR threshold may be dynamically adjusted in different DRX cycles.

In an example, if the system transmits the first notification in one DRX cycle and the first communications device does not establish a connection to the network, an SNR threshold for transmitting the first notification by the system may be changed in the next DRX cycle.

In an example, the system may predict an SNR threshold for a next DRX cycle based on a measured value at a previous instant.

In an example, the measured value at the previous instant may be an average value of measured values within a period of time. The period of time may be one or more slots, or may be one or more frames.

In an example, the first time period includes at least two first cycles. The at least two first cycles include a $1^{st}$ cycle and a $2^{nd}$ cycle that are adjacent to each other. A plurality of thresholds corresponding to the $2^{nd}$ cycle may be determined based on a plurality of thresholds corresponding to the $1^{st}$ cycle and the first quality parameter. The first quality parameter may be a quality parameter actually measured at a first instant (an instant k).

In an example, the first time period includes a $p^{th}$ cycle and a $(P+1)^{th}$ cycle, and P is a positive integer. Any of a plurality of thresholds in the (P+1)th cycle may be determined based on a corresponding threshold in the $p^{th}$ cycle. It is assumed that the plurality of thresholds include any threshold $SNR_v$, and any threshold $SNR_v(P+1)$ corresponding to the $(P+1)^{th}$ cycle is:

$$SNR_v(P+1) = \beta * SNR(k) + (1-\beta) * SNR_v(P),$$

where $SNR_v(P)$ represents any threshold corresponding to the $p^{th}$ cycle, SNR(k) represents a first quality parameter of a signal transmitted by the first communications device at an instant k, β represents a weight coefficient, and 0<β<1.

It may be learned that a new threshold is a weighted average of a real-time SNR and a threshold in a previous cycle. Based on this automatic adjustment mechanism, the system can automatically adjust sensitivity and a level of an alarm based on a current network condition, thereby providing better user experience in different network conditions.

The foregoing describes the method embodiment in which the first communications device provides the alarm alert based on the first notification of the second communications device. For ease of understanding, the following uses a scenario in which the first communications device is located in discontinuous coverage of an NTN as an example to illustrate this method embodiment. In other words, the second communications device includes a satellite in the NTN, and the first communications device communicates with a base station through the satellite.

The first communications device may determine, by using broadcast information, whether a cell in which the first communications device is located supports discontinuous coverage. For example, an SIB 32 in system information blocks may indicate that the cell supports discontinuous coverage.

In some embodiments, the first communications device may determine first time information related to discontinuous coverage. The first time information may include the related time information described above.

The first time information is a time parameter related to a scenario in which a terminal device is in discontinuous network coverage. In some embodiments, the first time information is a related time parameter when a terminal device enters from a scenario with network coverage to a scenario with no network coverage. In some embodiments, the first time information is a related time parameter when a terminal device enters from a scenario with no network coverage to a scenario with network coverage. The first time information may be an instant t1 at which the first communications device enters an unreachable state and unreachable duration T.

In an example, that the terminal device enters the scenario with no network coverage may also mean that the terminal device is in a scenario with discontinuous network coverage. Discontinuous network coverage may also be referred to as discontinuous cell coverage. In other word, the terminal device is within coverage of a cell at some instants, and may not be within coverage of any cell at some other instants.

In some embodiments, an SIB 32 or another system information block may further provide necessary information for discontinuous coverage prediction, such as an ephemeris and beam information. This also means that the first communications device can predict how long it is to stay within coverage of a current satellite.

In an example, in discontinuous coverage of an IoT NTN, the first communications device may determine, based on a predicted result, that the first communications device will soon enter discontinuous coverage. For example, when an elevation angle change is less than 5 degrees, or a reference location at which the first communications device in cell is less than a predefined value, the first communications device will soon enter discontinuous coverage. For another example, if the first communications device does not perform any UL/DL data transmission prior to expected arrival of a coverage gap, it may be considered that a coverage gap with no network coverage is imminent.

In an example, in a moving cell, the first communications device may predict cell service duration based on a broadcast reference location. The first communications device may signal a request to leave RRC_CONNECTED, and therefore the network also considers that it is time to release the first communications device. It should be noted that, if required by the network, a timer configuration may be released to prevent the first communications device from autonomously entering an idle state.

In an embodiment, since the first communications device may know location information thereof and a satellite location, the first communications device may roughly know when to enter discontinuous coverage. In other words, the first time information is determined based on a first distance between a projection location of a satellite on a ground and a location of the first communications device.

The projection location of the satellite on the ground may be determined by converting geocentric coordinates of the satellite. The geocentric coordinates of the satellite are usually represented as three values in a rectangular coordinate system, that is, x', y', and z'. By considering a rotation angular velocity $W_{earth}$ of the earth, the geocentric coordinates (x', y', z') may be converted into fixed coordinates (x, y, z) of the earth based on the following formula:

$$x = x'\cos(W_{earth}(t)) - y'\sin(W_{earth}(t));$$
$$y = y'\sin(W_{earth}(t)) + y'\cos(W_{earth}(t));$$
$$z = z',$$

where t represents time; x' represents a distance of the satellite along an X-axis relative to the center of the earth; y' represents a distance of the satellite along a Y-axis relative to the center of the earth; z' represents a distance of the satellite along a Z-axis relative to the center of the earth; and the Z-axis is usually aligned with a rotation axis of the earth (an axis around which the earth rotates), and therefore is not affected by the rotation of the earth.

The first distance may be used to determine whether a location of the terminal device is within a coverage radius R of the satellite. For each location, a satellite distance (a first distance d) of the location is calculated in an earth-fixed coordinate system. If the distance d is less than R, the point is within a serving cell. For the terminal device i, the corresponding first distance in the earth-fixed coordinate system may be used to determine whether the terminal device i is within a communication coverage radius, where d is:

$$d = \sqrt{(x-x_i)^2 + (y-y_i)^2 + (z-z_i)^2},$$

where d is the first distance between the satellite and the terminal device i. $(x_i, y_i, z_i)$ are location coordinates of the terminal device i. In some scenarios, the influence of a ground height on the z-coordinate may be disregarded, and both z and $z_i$ are thereby zero.

Optionally, if d≤R, the terminal device i is within the serving cell. Optionally, if d is less than a third threshold, the terminal device i is within the serving cell. The third threshold represents a minimum requirement for communication coverage.

In some embodiments, before entering a scenario with no network coverage, the first communications device may determine, based on first assistance information, whether to hand over from a serving cell corresponding to the satellite to a serving cell of a terrestrial network. In an example, an NB-IoT terminal device needs to determine, in an RRC idle state, whether to enter a PSM state or perform cell reselection to be connected to the serving cell of the TN.

In an embodiment, regardless of a service state of the first communications device, cell reselection may be performed before t1 is reached. For example, a timer is triggered at an instant t1−α, RRC switches from a connected state to an RRC idle state, and the first communications device starts to perform TN reselection.

The first assistance information includes discontinuous coverage information, a time required for coverage of a next satellite, related information of a neighboring cell or a TN cell, and the like, so that the first communications device determines whether to enter a TN area. Further, the first communications device may determine, based on a current communication state, whether communication needs to be continued, and the first assistance information, whether to hand over from an NTN cell to a TN cell.

In an example, a satellite orbit is fixed in the NTN. When the first communications device is in discontinuous coverage, a current serving cell may know a target cell of the first communications device. Therefore, some assistance information of the target cell may be provided for the first communications device in advance.

The first assistance information may be used by the first communications device to quickly find the target cell to complete cell selection/reselection, so as to reduce power consumption. In the NTN, before establishing a connection, the first communications device needs to obtain an SIB 31 again and perform GNSS measurement. This process takes several seconds to dozens of seconds, depending on different GNSS states (cold start and hot start). Because of a long round-trip time, a connection establishment process is also prolonged.

For example, for an internet of things NTN, when the first assistance information is configured, the first communications device may perform cell reselection or cell search outside discontinuous coverage to access the internet of things NTN. However, the first communications device may lack target cell information to assist the first communications device in performing cell reselection/selection, because neighboring cell information obtained before the first communications device enters discontinuous coverage is unavailable upon exiting discontinuous coverage. In this scenario, when the first communications device performs cell reselection/selection, more power consumption and access delay are caused.

In some embodiments, after the first communications device enters the scenario with no network coverage, the foregoing first time period includes a time period with no network coverage. When the first communications device receives the first notification after leaving the scenario with no network coverage, the one or more times of paging include paging that is cached by the second communications device and is related to the first communications device, so that the first communications device knows the lost one or more times of paging.

For example, after predicting the first time information, the first communications device reports the first time information to the NTN network. After a base station receives a notification from the first communications device, if information from a core network is received within duration T, the base station may cache or store the information. The information from the core network may include paging information. In addition, after receiving a notification from the first communications device, the core network may also cache paging information of the first communications device.

For example, for a fixed terminal device, after predicting the first time information, the first communications device may report the first time information to a base station in the NTN. After receiving the notification from the terminal device, the base station may cache related information of the terminal device from the core network within duration T, for example, paging information of the terminal device.

For example, for a moving terminal device, both a core network and a base station may cache paging information lost by the terminal device. A PLMN network with which the terminal device establishes a connection after duration T may be different from a previous network. Therefore, when the terminal device establishes the new PLMN network, the core network may transmit the cached paging information to a newly connected base station, and the new base station notifies the terminal device of the cached paging information. Alternatively, the core network may notify the base station that previously caches the paging information lost by the terminal device, and the base station transmits the cached information to a new base station.

In an example, when the location of the first communications device remains unchanged, the second communications device directly transmits cached paging related to the first communications device to the first communications device after the first time period.

In an example, when the location of the first communications device changes, the second communications device transmits cached paging related to the first communications device to a third communications device after the first time period, so that the third communications device notifies the first communications device. The third communications device may be a new network device with which the first communications device establishes a connection after the first time period, for example, a new base station.

With reference to FIG. 7 to FIG. 10, the foregoing describes the method embodiment in which the first communications device provides the alarm alert based on the first notification transmitted by the second communications device. To ensure transmission of the first notification, the second communications device needs to configure the transmission parameter of the first notification.

Optionally, the second communications device may determine configuration information of a transmit antenna used to transmit the first notification and a first notification level corresponding to the first notification. Further, the second communications device may determine a quantity of repetition times of the first notification based on the configuration information and the first notification level.

In an example, a transmit antenna configuration selected by the second communications device includes a quantity of transmit antennas used to transmit the first notification. Further, the second communications device may transmit an alarm signal by using a plurality of transmit antennas. For example, for an internet of things terminal device, considering a DRX or eDRX cycle length, the second communications device may determine the quantity of repetition times of the first notification based on a transmit antenna configuration and a notification level.

Optionally, after receiving the first notification, the first communications device may decode the related transmission parameter of the first notification by using a decoding unit. For example, the decoding unit may be configured to decode information such as the configuration information of the transmit antenna used to transmit the first notification, the first notification level corresponding to the first notification, and the quantity of repetition times of the first notification.

In an example, the decoding unit corresponding to the first notification is configured to perform at least one of the following: determining configuration information of a transmit antenna of the second communications device; determining information about an activity level of the first communications device; or determining the quantity of repetition times of the first notification based on a transmit antenna configuration and an activity level. Further, the first communications device may receive the first notification, where the first notification includes at least the determined quantity of repetition times.

The foregoing describes method embodiments of the present application in detail with reference to FIG. 1 to FIG. 10. The following describes in detail apparatus embodiments of the present application with reference to FIG. 11 to FIG. 13. It should be understood that the descriptions of the apparatus embodiments correspond to the descriptions of the method embodiments, and therefore, for parts that are not described in detail, refer to the foregoing method embodiments.

Figure 11:
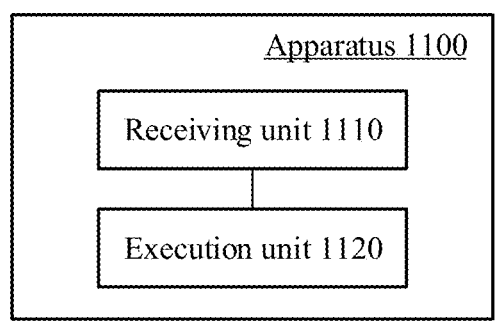
FIG. 11 is a schematic structural diagram of an apparatus for wireless communication according to an embodiment of the present application.

FIG. 11 is a schematic block diagram of an apparatus for wireless communication according to an embodiment of the present application. The apparatus 1100 may be any first communications device described above. The apparatus 1100 shown in FIG. 11 includes a receiving unit 1110 and an execution unit 1120.

The receiving unit 1110 may be configured to receive a first notification transmitted by a second communications device.

The execution unit 1120 may be configured to provide an alarm alert based on the first notification, where the first notification is used to indicate one or more times of paging within a first time period, and the one or more times of paging include paging that has not been successfully received by the first communications device and/or paging that cannot be successfully received by the first communications device in a current state.

Optionally, the first notification further includes one or more of the following information: a message ID corresponding to the first notification; a quantity of the one or more times of paging; an originating node of some or all paging in the one or more times of paging; or related information of an event corresponding to the one or more times of paging.

Optionally, a $1^{st}$ time of paging within the first time period is first paging, the first notification includes a first sequence, and the first sequence is generated and/or scrambled based on at least one of the following parameters: a physical cell ID; a TMSI of the first communications device; an index number of a start time location of a transmission occasion of the first notification; an index number of a synchronization signal block associated with the first notification; or an index number of a time location associated with a $1^{st}$ PDCCH corresponding to the first paging.

Optionally, the first notification is carried in one or more of the following: a short message, a dedicated channel, or a system information block.

Optionally, a manner of providing the alarm alert is determined based on at least one of a communication scenario of the first communications device, a user setting, or a first notification level corresponding to the first notification.

Optionally, a transmission parameter of the first notification is determined based on one or more of the following parameters: a $1^{st}$ paging occasion within the first time period and a first offset; an end instant of the first time period and a second offset; a first notification level corresponding to the first notification; a quantity of first cycles included in the first time period; or a first quality parameter of a signal transmitted by the first communications device at a first instant.

Optionally, the first offset or the second offset is determined based on a service type of the first communications device and/or the first notification level.

Optionally, the first quality parameter is used by the second communications device to predict a second quality parameter based on artificial intelligence, and the second quality parameter is a quality parameter of a signal transmitted by the first communications device at any instant after the first instant.

Optionally, the first communications device is a terminal device i of M terminal devices, where M is a positive integer, i is a natural number from 0 to M−1, and the first instant is an instant k; and when the first quality parameter is $SNR_i(k)$, a quality parameter $SNR_i(k+n)$ of a signal transmitted by the terminal device i at an instant k+n is:

$$SNR_i(k+n) = SNR_i(k) + n * [SNR_i(k) - SNR_i(k-1)],$$

where $SNR_i(k-1)$ represents a quality parameter of a signal transmitted by the terminal device i at an instant k−1, where k>1 and n>0.

Optionally, the first quality parameter is used to determine a second quality parameter, the first notification level is determined based on the second quality parameter and a plurality of thresholds, the plurality of thresholds include a first threshold and a second threshold that are related to the second quality parameter, and the first threshold is less than the second threshold.

Optionally, transmission of the first notification is a repetition of transmission, and the second quality parameter and the plurality of thresholds are used to determine a quantity of repetition times of the first notification.

Optionally, the first time period includes Q first cycles, Q is a positive integer greater than 1, and the quantity N of repetition times of the first notification is: when the second quality parameter is less than or equal to the first threshold, N is equal to Q or Q−1; when the second quality parameter is greater than the first threshold and less than or equal to the second threshold, N is greater than 1 and less than Q; or when the second quality parameter is greater than the second threshold, N is equal to 1.

Optionally, the first time period includes at least two first cycles, the at least two first cycles include a $1^{st}$ cycle and a $2^{nd}$ cycle that are adjacent to each other, and a plurality of thresholds corresponding to the $2^{nd}$ cycle are determined based on a plurality of thresholds corresponding to the $1^{st}$ cycle and the first quality parameter.

Optionally, the first time period includes a $p^{th}$ cycle and a $(p+1)^{th}$ cycle, P is a positive integer, the plurality of thresholds include any threshold $SNR_v$, and any threshold $SNR_v$ (P+1) corresponding to the $(p+1)^{th}$ cycle is:

$$SNR_v(P+1) = \beta * SNR(k) + (1-\beta) * SNR_v(P),$$

where $SNR_v(P)$ represents any threshold corresponding to the $p^{th}$ cycle, $SNR(k)$ represents the first quality parameter, $\beta$ represents a weight coefficient, and $0<\beta<1$.

Figure 14:
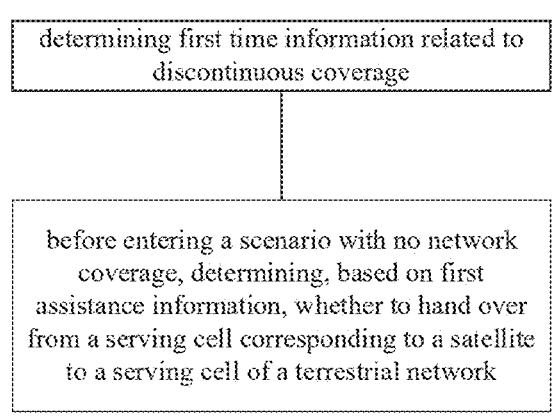
FIG. 14 is a schematic flowchart of a method for wireless communication according to an embodiment of the present application.

Optionally, the second communications device includes a satellite in an NTN, and the apparatus 1100 further includes a first determining unit, determining first time information related to discontinuous coverage; and a second determining unit, before the apparatus enters a scenario with no network coverage, determining, based on first assistance information, whether to hand over from a serving cell corresponding to the satellite to a serving cell of a terrestrial network, as shown in FIG. 14.

Optionally, the first time information is determined based on a first distance between a projection location of the satellite on a ground and a location of the first communications device.

Optionally, when the first communications device receives the first notification after leaving the scenario with no network coverage, the first time period includes a time period with no network coverage, and the one or more times of paging include paging that is cached by the second communications device and is related to the first communications device.

Optionally, the apparatus 1100 further includes a decoding unit, decoding configuration information of a transmit antenna used to transmit the first notification; decoding a first notification level corresponding to the first notification; and decoding a quantity of repetition times of the first notification.

Figure 12:
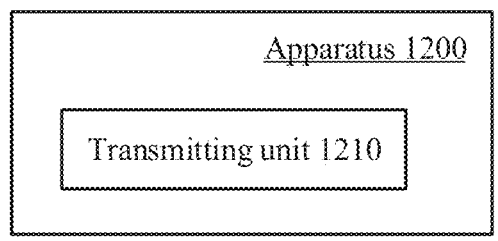
FIG. 12 is a schematic structural diagram of another apparatus for wireless communication according to an embodiment of the present application.

FIG. 12 is a schematic block diagram of another apparatus for wireless communication according to an embodiment of the present application. The apparatus 1200 may be any second communications device described above. The apparatus 1200 shown in FIG. 12 includes a transmitting unit 1210.

The transmitting unit 1210 may be configured to transmit a first notification to a first communications device, where the first notification is used by the first communications device to provide an alarm alert, the first notification is further used to indicate one or more times of paging within a first time period, and the one or more times of paging include paging that has not been successfully received by the first communications device and/or paging that cannot be successfully received by the first communications device in a current state.

Optionally, the first notification further includes one or more of the following information: a message ID corresponding to the first notification; a quantity of the one or more times of paging; an originating node of some or all paging in the one or more times of paging; or related information of an event corresponding to the one or more times of paging.

Optionally, a $1^{st}$ time of paging within the first time period is first paging, the first notification includes a first sequence, and the first sequence is generated and/or scrambled based on at least one of the following parameters: a physical cell ID; a TMSI of the first communications device; an index number of a start time location of a transmission occasion of the first notification; an index number of a synchronization signal block associated with the first notification; or an index number of a time location associated with a $1^{st}$ PDCCH corresponding to the first paging.

Optionally, the first notification is further used to indicate an originating node of some or all paging in the one or more times of paging.

Optionally, the first notification is carried in one or more of the following: a short message, a dedicated channel, or a system information block.

Optionally, a manner of providing the alarm alert is determined based on at least one of a communication scenario of the first communications device, a user setting, or a first notification level corresponding to the first notification.

Optionally, a transmission parameter of the first notification is determined based on one or more of the following parameters: a $1^{st}$ paging occasion within the first time period and a first offset; an end instant of the first time period and a second offset; a first notification level corresponding to the first notification; a quantity of first cycles included in the first time period; or a first quality parameter of a signal transmitted by the first communications device at a first instant.

Optionally, the first offset or the second offset is determined based on a service type of the first communications device and/or the first notification level.

Optionally, the apparatus 1200 further includes a prediction unit, predicting a second quality parameter based on artificial intelligence and the first quality parameter, where the second quality parameter is a quality parameter of a signal transmitted by the first communications device at any instant after the first instant.

Optionally, the first communications device is a terminal device i of M terminal devices, where M is a positive integer, i is a natural number from 0 to M−1, and the first instant is an instant k; and when the first quality parameter is $SNR_i(k)$, a quality parameter $SNR_i(k+n)$ of a signal transmitted by the terminal device i at an instant k+n is:

$$SNR_i(k+n) = SNR_i(k) + n*[SNR_i(k) - SNR_i(k-1)],$$

where (k−1) represents a quality parameter of a signal transmitted by the terminal device i at an instant k−1, where k>1 and n>0.

Optionally, the first quality parameter is used to determine a second quality parameter, the first notification level is determined based on the second quality parameter and a plurality of thresholds, the plurality of thresholds include a first threshold and a second threshold that are related to the second quality parameter, and the first threshold is less than the second threshold.

Optionally, transmission of the first notification is a repetition of transmission, and the second quality parameter and the plurality of thresholds are used to determine a quantity of repetition times of the first notification.

Optionally, the first time period includes Q first cycles, Q is a positive integer greater than 1, and the quantity N of repetition times of the first notification is: when the second quality parameter is less than or equal to the first threshold, N is equal to Q or Q−1; when the second quality parameter is greater than the first threshold and less than or equal to the second threshold, N is greater than 1 and less than Q; or when the second quality parameter is greater than the second threshold, N is equal to 1.

Optionally, the first time period includes at least two first cycles, the at least two first cycles include a $1^{st}$ cycle and a $2^{nd}$ cycle that are adjacent to each other, and a plurality of thresholds corresponding to the $2^{nd}$ cycle are determined based on a plurality of thresholds corresponding to the $1^{st}$ cycle and the first quality parameter.

Optionally, the first time period includes a $p^{th}$ cycle and a $(p+1)^{th}$ cycle, P is a positive integer, the plurality of thresholds include any threshold $SNR_v$, and any threshold $SNR_v(P+1)$ corresponding to the $(p+1)^{th}$ cycle is:

$$SNR_v(P+1) = \beta*SNR(k) + (1-\beta)*SNR_v(P),$$

where $SNR_v(P)$ represents any threshold corresponding to the $p^{th}$ cycle, SNR(k) represents the first quality parameter, β represents a weight coefficient, and 0<β<1.

Optionally, the second communications device includes a satellite in an NTN, and the transmitting unit is further configured to transmit first assistance information to the first communications device, where the first assistance information is used by the first communications device to determine, before entering a scenario with no network coverage, whether to hand over from a serving cell corresponding to the satellite to a serving cell of a terrestrial network, and whether the first communications device enters the scenario with no network coverage is determined based on first time information related to discontinuous coverage.

Optionally, the first time information is determined based on a first distance between a projection location of the satellite on a ground and a location of the first communications device.

Optionally, when the first communications device receives the first notification after leaving the scenario with no network coverage, the first time period includes a time period with no network coverage, and the one or more times of paging include paging that is cached by the second communications device and is related to the first communications device.

Optionally, the apparatus 1300 further includes a determining unit, determining configuration information of a transmit antenna used to transmit the first notification; determining a first notification level corresponding to the first notification; and determining a quantity of repetition times of the first notification based on the configuration information and the first notification level.

Figure 13:
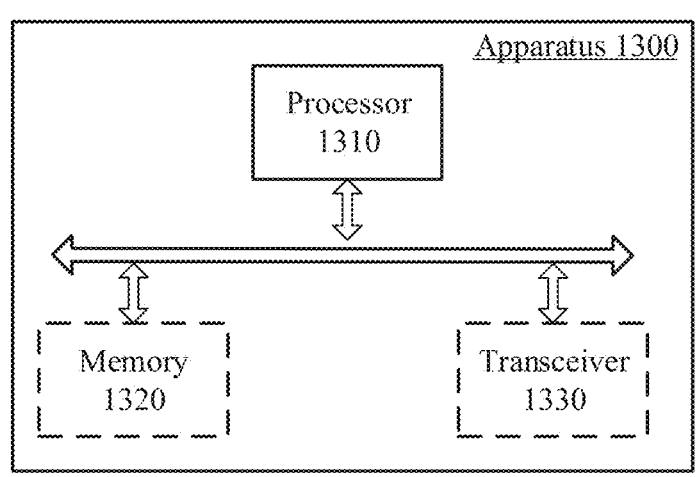
FIG. 13 is a schematic structural diagram of a communications apparatus according to an embodiment of the present application.

FIG. 13 is a schematic structural diagram of a communications apparatus according to an embodiment of the present application. Dashed lines in FIG. 13 indicate that a unit or module is optional. The apparatus 1300 may be configured to implement a method described in the foregoing method embodiment. The apparatus 1300 may be a chip, a terminal device, or a network device.

The apparatus 1300 may include one or more processors 1310. The processor 1310 may enable the apparatus 1300 to implement a method described in the foregoing method embodiment. The processor 1310 may be a general-purpose processor or a dedicated processor. For example, the processor may be a central processing unit (central processing unit, CPU). Alternatively, the processor may be another general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

The apparatus 1300 may further include one or more memories 1320. The memory 1320 stores a program, and the program may be executed by the processor 1310, so that the processor 1310 executes a method described in the foregoing method embodiment. The memory 1320 may be separate from the processor 1310 or may be integrated into the processor 1310.

The apparatus 1300 may further include a transceiver 1330. The processor 1310 may communicate with another device or chip through the transceiver 1330. For example, the processor 1310 may transmit data to and receive data from another device or chip through the transceiver 1330.

An embodiment of the present application further provides a computer-readable storage medium for storing a program. The computer-readable storage medium may be applied to the terminal device or the network device according to embodiments of the present application, and the program causes a computer to execute a method executed by the first communications device or the second communications device in embodiments of the present application.

The computer-readable storage medium may be any usable medium that a computer can read, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive (solid state disk, SSD)), or the like.

An embodiment of the present application further provides a computer program product. The computer program product includes a program. The computer program product may be applied to the terminal device or the network device according to embodiments of the present application, and the program causes a computer to execute a method executed by the first communications device or the second communications device in embodiments of the present application.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, the procedures or functions according to embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired (such as a coaxial cable, an optical fiber, and a digital subscriber line (digital subscriber line, DSL)) manner or a wireless (such as infrared, wireless, and microwave) manner.

An embodiment of the present application further provides a computer program. The computer program may be applied to the terminal device or the network device according to embodiments of the present application, and the computer program causes a computer to execute a method executed by the communications device in embodiments of the present application.

The terms "system" and "network" in the present application may be used interchangeably. In addition, the terms used in the present application are only used to explain specific embodiments of the present application, and are not intended to limit the present application. In the specification, claims, and accompanying drawings of the present application, the terms "first", "second", "third", "fourth", and so on are intended to distinguish between different objects but do not describe a particular order. In addition, the terms "include" and "have" and any variations thereof are intended to cover a non-exclusive inclusion.

In embodiments of the present application, "indicate" mentioned herein may refer to a direct indication, or may refer to an indirect indication, or may mean that there is an association relationship. For example, A indicates B, which may mean that A directly indicates B, for example, B may be obtained by using A; or may mean that A indirectly indicates B, for example, A indicates C, and B may be obtained by using C; or may mean that there is an association relationship between A and B.

In embodiments of the present application, the term "corresponding" may mean that there is a direct or indirect correspondence between the two, or may mean that there is an association relationship between the two, which may also be a relationship such as indicating and being indicated, or configuring and being configured.

In embodiments of the present application, "pre-defined" or "pre-configured" may be implemented by pre-storing corresponding codes, tables, or other forms that can be used to indicate related information in devices (for example, including the terminal device and the network device), and a specific implementation thereof is not limited in the present application. For example, being pre-defined may refer to being defined in a protocol.

In embodiments of the present application, the "protocol" may refer to a standard protocol in the communications field, and may include, for example, an LTE protocol, an NR protocol, and a related protocol applied to a future communications system, which is not limited in the present application.

In embodiments of the present application, determining B based on A does not mean determining B based on only A, but instead B may be determined based on A and/or other information.

In embodiments of the present application, the term "and/or" is merely an association relationship that describes associated objects, and represents that there may be three relationships. For example, A and/or B may represent three cases: only A exists, both A and B exist, and only B exists. In addition, the character "/" herein generally indicates an "or" relationship between the associated objects.

In embodiments of the present application, sequence numbers of the foregoing processes do not mean execution sequences. The execution sequences of the processes should be determined based on functions and internal logic of the processes, and should not be construed as any limitation on the implementation processes of embodiments of the present application.

In several embodiments provided in the present application, it should be understood that, the disclosed system, apparatus, and method may be implemented in other manners. For example, the foregoing described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. Indirect couplings or communication connections between apparatuses or units may be implemented in electrical, mechanical, or other forms.

The units described as separate parts may be or may not be physically separate, and parts displayed as units may be or may not be physical units, and may be at one location, or may be distributed on a plurality of network elements. Some or all of the units may be selected according to actual requirements to achieve the objectives of the solutions of embodiments.

In addition, functional units in embodiments of the present application may be integrated into one processing unit, or each of the units may exist alone physically, or two or more units may be integrated into one unit.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for wireless communication, comprising:
receiving, by a first communications device in a non-terrestrial network (NTN), a first notification transmitted by a second communications device in the NTN, wherein the first notification is carried in one or more of the following: a short message, a dedicated channel, or a system information block;
determining, by the first communications device based on the first notification, first time information related to discontinuous coverage; and
before entering a scenario without network coverage, determining, by the first communications device based on first assistance information previously provided by a network device, whether to hand over from a serving cell corresponding to a satellite in the NTN to a serving cell of a terrestrial network,
wherein the first time information is determined based on a first distance between a projection location of the satellite on a ground and a location of the first communications device.

2. The method according to claim 1, wherein the receiving, by the first communications device, the first notification transmitted by the second communications device comprises:
decoding, by the first communications device, configuration information of a transmit antenna used to transmit the first notification;
decoding, by the first communications device, a first notification level corresponding to the first notification; and
decoding, by the first communications device, a quantity of repetition times of the first notification.

3. The method according to claim 1, wherein the first notification further comprises one or more of the following information:
a message identity (ID) corresponding to the first notification;
a quantity of one or more times of paging;
an originating node of some or all paging in the one or more times of paging; or
related information of an event corresponding to the one or more times of paging.

4. The method according to claim 1, further comprising:
providing, by the first communications device, an alarm alert based on the first notification, wherein the first notification indicates one or more times of paging within a first time period, and the one or more times of paging comprise at least one of paging that has not been successfully received by the first communications device or paging that cannot be successfully received by the first communications device in a current state.

5. The method according to claim 4, wherein the first time period comprises a time period with no network coverage, and the one or more times of paging comprise paging that is cached by the second communications device and is related to the first communications device.

6. The method according to claim 4, wherein a $1^{st}$ time of paging within the first time period is first paging, the first notification comprises a first sequence, and the first sequence is generated or scrambled based on at least one of the following parameters:
   a physical cell ID;
   a temporary mobile subscriber identifier TMSI of the first communications device;
   an index number of a start time location of a transmission occasion of the first notification;
   an index number of a synchronization signal block associated with the first notification; or
   an index number of a time location associated with a $1^{st}$ physical downlink control channel PDCCH corresponding to the first paging.

7. The method according to claim 4, wherein a manner of providing the alarm alert is determined based on at least one of a communication scenario of the first communications device, a user setting, or a first notification level corresponding to the first notification.

8. The method according to claim 4, wherein a transmission parameter of the first notification is determined based on one or more of the following parameters:
   a $1^{st}$ paging occasion within the first time period and a first offset;
   an end instant of the first time period and a second offset;
   a first notification level corresponding to the first notification;
   a quantity of first cycles comprised in the first time period; or
   a first quality parameter of a signal transmitted by the first communications device at a first instant.

9. The method according to claim 8, wherein the first offset or the second offset is determined based on at least one of a service type of the first communications device or the first notification level.

10. The method according to claim 8, wherein the first quality parameter is used by the second communications device to predict a second quality parameter based on artificial intelligence, and the second quality parameter is a quality parameter of a signal transmitted by the first communications device at any instant after the first instant.

11. The method according to claim 8, wherein the first communications device is a terminal device i of M terminal devices, wherein M is a positive integer, i is a natural number from 0 to M−1, and the first instant is an instant k; and when the first quality parameter is $SNR_i(k)$, a quality parameter $SNR_i(k+n)$ of a signal transmitted by the terminal device i at an instant k+n is:

$$SNR_i(k+n) = SNR_i(k) + n * [SNR_i(k) - SNR_i(k-1)],$$

wherein $SNR_i(k-1)$ represents a quality parameter of a signal transmitted by the terminal device i at an instant k−1, wherein k>1 and n>0.

12. The method according to claim 8, wherein the first quality parameter is used to determine a second quality parameter, the first notification level is determined based on the second quality parameter and a plurality of thresholds, the plurality of thresholds comprise a first threshold and a second threshold that are related to the second quality parameter, and the first threshold is less than the second threshold.

13. The method according to claim 12, wherein transmission of the first notification is a repetition of transmission, and the second quality parameter and the plurality of thresholds are used to determine a quantity of repetition times of the first notification.

14. The method according to claim 12, wherein the first time period comprises Q first cycles, Q is a positive integer greater than 1, and the quantity N of repetition times of the first notification is:
   when the second quality parameter is less than or equal to the first threshold, N is equal to Q or Q−1;
   when the second quality parameter is greater than the first threshold and less than or equal to the second threshold, N is greater than 1 and less than Q; or
   when the second quality parameter is greater than the second threshold, N is equal to 1.

15. The method according to claim 8, wherein the first time period comprises at least two first cycles, the at least two first cycles comprise a $1^{st}$ cycle and a $2^{nd}$ cycle that are adjacent to each other, and a plurality of thresholds corresponding to the $2^{nd}$ cycle are determined based on a plurality of thresholds corresponding to the $1^{st}$ cycle and the first quality parameter.

16. The method according to claim 15, wherein the first time period comprises a $p^{th}$ cycle and a $(p+1)^{th}$ cycle, P is a positive integer, the plurality of thresholds comprise threshold $SNR_v(P)$ corresponding to the $p^{th}$ cycle and threshold $SNR_v(P+1)$ corresponding to the $(p+1)^{th}$ cycle, wherein $$SNR_v(P+1) = \beta * SNR(k) + (1-\beta) * SNR_v(P),$$

wherein $SNR_v(P)$ represents the threshold corresponding to the $p^{th}$ cycle, $SNR(k)$ represents the first quality parameter, $\beta$ represents a weight coefficient, and $0<\beta<1$.

17. A method for wireless communication, comprising:
   transmitting, by a second communications device, a first notification to a first communications device in an NTN, wherein the first notification is carried in one or more of the following: a short message, a dedicated channel, or a system information block,
   wherein the first notification is used by the first communications device to provide an alarm alert, the first notification comprises information indicating first time information related to discontinuous coverage.

18. An apparatus, comprising:
   at least one processor; and
   one or more non-transitory computer-readable storage media coupled to the at least one processor and storing programming instructions for execution by the at least one processor, wherein the programming instructions, when executed, cause the apparatus to perform operations comprising:
   receiving a first notification transmitted by a second communications device in a non-terrestrial network (NTN), wherein the first notification is carried in one or more of the following: a short message, a dedicated channel, or a system information block;
   determining, based on the first notification, first time information related to discontinuous coverage; and
   before entering a scenario without network coverage, determining, based on first assistance information previously provided by a network device, whether to hand over from a serving cell corresponding to a satellite in the NTN to a serving cell of a terrestrial network, wherein the first time information is determined based on a first distance between a projection location of the satellite on a ground and a location of the apparatus.

19. The apparatus according to claim 18, wherein the receiving the first notification transmitted by the second communications device comprises:
  decoding configuration information of a transmit antenna used to transmit the first notification;
  decoding a first notification level corresponding to the first notification; and
  decoding a quantity of repetition times of the first notification.

* * * * *